(12) United States Patent
Fujishiro et al.

(10) Patent No.: US 10,772,013 B2
(45) Date of Patent: Sep. 8, 2020

(54) RADIO TERMINAL AND BASE STATION

(71) Applicant: KYOCERA CORPORATION, Kyoto (JP)

(72) Inventors: Masato Fujishiro, Yokohama (JP); Chiharu Yamazaki, Tokyo (JP); Kugo Morita, Yokohama (JP); Noriyoshi Fukuta, Inagi (JP)

(73) Assignee: KYOCERA Corporation, Kyoto (JP)

( * ) Notice: Subject to any disclaimer, the term of this patent is extended or adjusted under 35 U.S.C. 154(b) by 23 days.

(21) Appl. No.: 16/043,577

(22) Filed: Jul. 24, 2018

(65) Prior Publication Data

US 2018/0332507 A1    Nov. 15, 2018

Related U.S. Application Data

(63) Continuation of application No. PCT/JP2017/001860, filed on Jan. 20, 2017.

(30) Foreign Application Priority Data

Jan. 25, 2016  (JP) ................................. 2016-011914
May 13, 2016  (JP) ................................. 2016-096965

(51) Int. Cl.
*H04W 36/00*     (2009.01)
*H04J 11/00*     (2006.01)
(Continued)

(52) U.S. Cl.
CPC ......... *H04W 36/0069* (2018.08); *H04J 11/00* (2013.01); *H04W 36/0072* (2013.01);
(Continued)

(58) Field of Classification Search
CPC ......... H04W 36/0069; H04W 36/0072; H04W 36/08; H04W 36/28; H04W 36/0077
See application file for complete search history.

(56) References Cited

U.S. PATENT DOCUMENTS 9,509,485 B2 * 11/2016 Zhang ............... H04W 72/1215
10,009,897 B2   6/2018 Uemura et al.
(Continued)

FOREIGN PATENT DOCUMENTS

CN      103428786 A    12/2013
JP      2007-533256 A  11/2007
(Continued)

OTHER PUBLICATIONS

Nokia Networks; New WI: Improved Mobility for Synchronous LTE Networks (MobSync); 3GPP TSG RAN Meeting # 70; RP-151968; Dec. 7-10, 2015; 6 pages; Sitges, Spain.
(Continued)

Primary Examiner — Ian N Moore
Assistant Examiner — Latresa A McCallum
(74) Attorney, Agent, or Firm — Studebaker & Brackett PC

(57) ABSTRACT

A UE (100) receives a handover command from a source cell to perform a handover to a target cell in response to the handover command. The handover command includes a notification indicating omitting a random access procedure during the handover. The UE (100) omits, in response to the notification, the random access procedure during the handover.

3 Claims, 14 Drawing Sheets

(51) Int. Cl.
  *H04W 56/00* (2009.01)
  *H04W 36/08* (2009.01)
  *H04W 36/28* (2009.01)

(52) U.S. Cl.
  CPC ........... *H04W 36/08* (2013.01); *H04W 36/28* (2013.01); *H04W 56/0045* (2013.01); *H04W 36/0077* (2013.01)

(56) References Cited

U.S. PATENT DOCUMENTS

| | | |
|---|---|---|
| 2005/0233752 A1 | 10/2005 | Laroia et al. |
| 2014/0041841 A1* | 2/2014 | Huazhao ............. F28D 1/05383 165/173 |
| 2014/0194126 A1 | 7/2014 | Tsuboi et al. |
| 2015/0016433 A1 | 1/2015 | Ramos et al. |
| 2016/0165490 A1 | 6/2016 | Nagasaka et al. |
| 2016/0192261 A1* | 6/2016 | Wang ................ H04W 36/0055 370/331 |
| 2016/0227459 A1 | 8/2016 | Fujishiro et al. |
| 2018/0014230 A1* | 1/2018 | Dalsgaard ......... H04W 36/0077 |
| 2018/0199245 A1* | 7/2018 | Futaki .................. H04W 16/32 |
| 2018/0199251 A1* | 7/2018 | Kim .................... H04W 72/042 |

FOREIGN PATENT DOCUMENTS

| | | |
|---|---|---|
| JP | 2011-238999 A | 11/2011 |
| JP | 2013-5366 A | 1/2013 |
| JP | 2013-042259 A | 2/2013 |
| JP | 2013-042264 A | 2/2013 |
| JP | 2013-201632 A | 10/2013 |
| JP | 2015-027014 A | 2/2015 |
| WO | 2015/115621 A1 | 8/2015 |
| WO | 2015/127987 A1 | 9/2015 |

OTHER PUBLICATIONS

Nokia Networks; Motivation for WI Improved Mobility for Synchronous LTE Networks (MobSync); 3GPP TSG RAN Meeting # 70; RP-151969; Dec. 7-10, 2015; 3 pages; Sitges, Spain.
Alcatel-Lucent; RACH-less Handover in synchronized networks; 3GPP TSG-RAN WG 2 #58bis LTE; R2-072655; Jun. 25-29, 2007; 4 pages; Orlando, U.S.A.

* cited by examiner

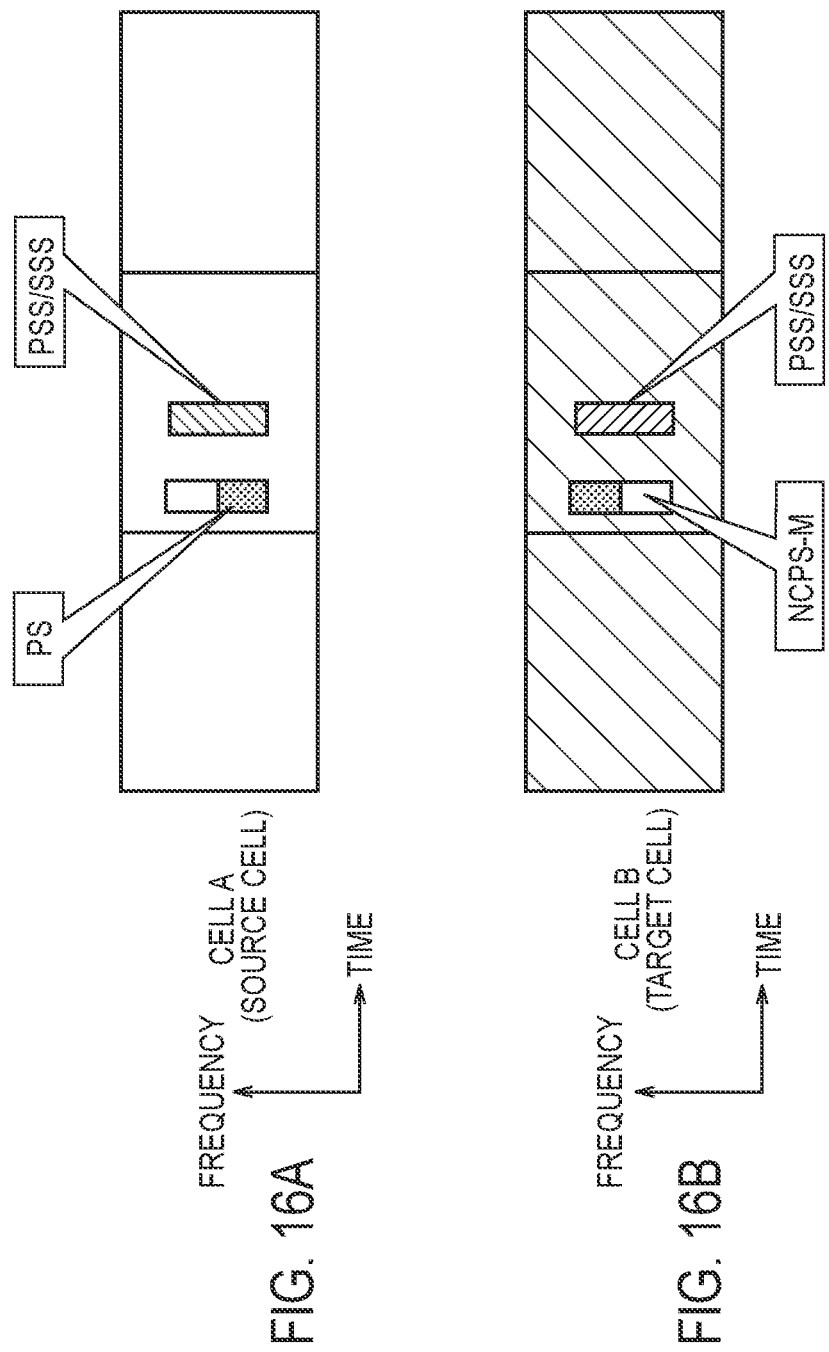

RADIO TERMINAL AND BASE STATION

CROSS-REFERENCE TO RELATED APPLICATION

The present application is a continuation based on PCT Application No. PCT/JP2017/001860 filed on Jan. 20, 2017, which claims the benefit of Japanese Patent Application No. 2016-011914 (filed on Jan. 25, 2016) and Japanese Patent Application No. 2016-096965 (filed on May 13, 2016). The content of which is incorporated by reference herein in their entirety.

TECHNICAL

The present invention relates to a radio terminal and a base station used in a mobile communication system.

BACKGROUND

In a mobile communication system, a radio terminal performs a handover from a source cell to a target cell. The radio terminal performs a random access procedure with the target cell during the handover. The random access procedure may be referred to as RACH (Random Access Channel) procedure.

The random access procedure includes a process of transmitting, by the radio terminal, a random access preamble to the target cell, and a process of receiving, by the radio terminal, a random access response from the target cell. The random access response includes an uplink grant indicating an uplink radio resource allocated to the radio terminal in the target cell, and a timing advance value to be applied to an uplink transmission to the target cell (transmission timing adjustment value).

SUMMARY

A radio terminal according to a first aspect comprises a controller configured to receive a handover command from a source cell to perform a handover to a target cell in response to the handover command. The handover command includes a notification indicating omitting a random access procedure during the handover. The controller omits, in response to the notification, the random access procedure during the handover.

A base station according to a second aspect manages a source cell of at least a radio terminal. The base station comprises a controller configured to transmit a handover command instructing a handover to a target cell, to a radio terminal. The handover command includes a notification indicating omitting a random access procedure during the handover.

A base station according to a third aspect manages a target cell of a radio terminal. The base station comprises a controller configured to receive a handover request message from another base station configured to manage a source cell and transmit a handover acknowledge message to the other base station. The handover request message includes capability information indicating that the radio terminal has a capability to perform a handover where a random access procedure is omitted. The handover acknowledge message includes a notification indicating that the random access procedure is omitted during the handover.

BRIEF DESCRIPTION OF THE DRAWINGS

FIGS. 16A and 16B are diagrams illustrating first and second known signals according to a seventh embodiment.

DESCRIPTION OF THE EMBODIMENT

Figure 1:
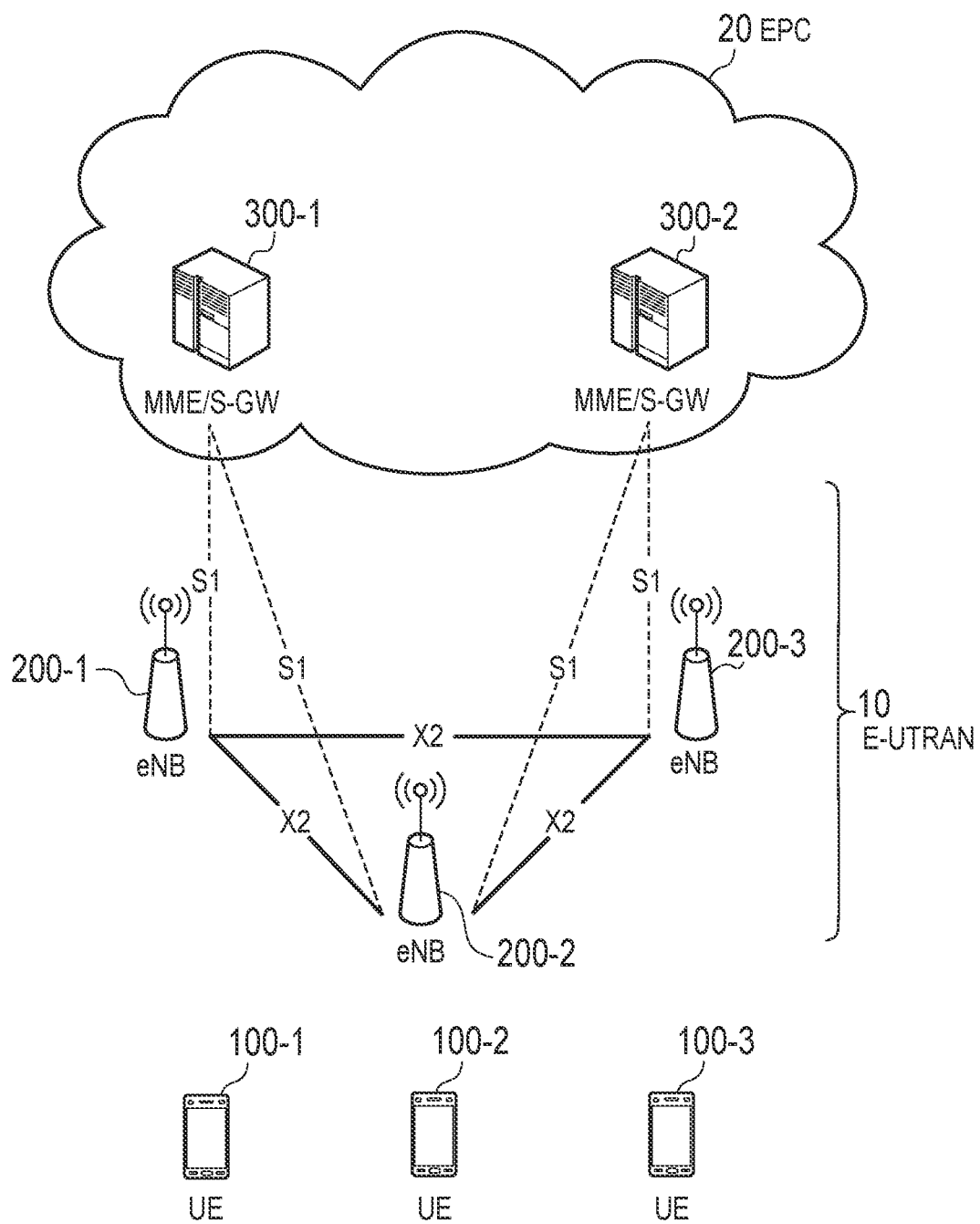
FIG. 1 is a diagram illustrating a configuration of an LTE system.

A radio terminal according to a first embodiment to a seventh embodiment comprises a controller configured to receive a handover command from a source cell to perform a handover to a target cell in response to the handover command. The handover command includes a notification indicating omitting a random access procedure during the handover. The controller omits, in response to the notification, the random access procedure during the handover.

In the radio terminal according to the first embodiment to the seventh embodiment, the controller is configured to transmit, before a handover, capability information indicating that the radio terminal has a capability to perform the handover where the random access procedure is omitted, to the source cell. The capability information is used for determining whether the handover where the random access procedure is omitted is applied.

In the radio terminal according to the first embodiment to the seventh embodiment, the controller is configured to perform processes of: receiving from the source cell an uplink grant indicating an uplink radio resource to be allocated, in the target cell, to the radio terminal, and omitting the random access procedure, and performing uplink transmission to the target cell by using the uplink radio resource indicated by the uplink grant.

In the radio terminal according to the second embodiment, the handover command includes a timing advance value or a timing advance group identifier to be applied to the uplink transmission to the target cell. The controller is configured to use the timing advance value or the timing advance group identifier to adjust an uplink transmission timing to the target cell.

In the radio terminal according to the second embodiment, the controller is configured to transmit, before the handover, a measurement report including speed information indicating a moving speed of the own radio terminal, to the source cell. The speed information is used for at least one of determining whether the handover where the random access procedure is omitted is applied and deciding the timing advance value.

In the radio terminal according to the fourth embodiment, the handover command includes configuration information of a secondary cell to be added to the target cell, and an activation indication to activate the secondary cell. The controller is configured to set the secondary cell in accordance with the configuration information, and in accordance with the activation indication, activates the set secondary cell.

In the radio terminal according to the fifth embodiment, before the handover, the radio terminal has a dual connection between a master base station configured to manage the source cell and a secondary base station. The controller is configured to omit a random access procedure to a cell of the secondary base station, during the handover.

In the radio terminal according to the sixth embodiment, before the handover, the controller is configured to: receive instruction information instructing a pre-random access procedure to the target cell from the source cell, and perform the pre-random access procedure in accordance with the instruction information.

In the radio terminal according to the seventh embodiment, before the handover, the controller is configured to: receive a first known signal transmitted from the source cell and a second known signal transmitted from the target cell, calculate an arrival time difference between the first and second known signals, and based on a first timing advance value and the arrival time difference to be applied to the source cell, decide a second timing advance value to be applied to the target cell.

In the radio terminal according to the seventh embodiment, before the handover, the controller is configured to: calculate a received power difference between the first and second known signals, and decide, based on the received power difference, an uplink transmission power to be applied to the target cell.

A base station according to the first embodiment to the seventh embodiment manages a source cell of at least a radio terminal. The base station comprises a controller configured to transmit a handover command instructing a handover to a target cell, to a radio terminal. The handover command includes a notification indicating omitting a random access procedure during the handover.

In the base station according to the first embodiment to the seventh embodiment, the controller is configured to: receive, before the handover, capability information indicating that the radio terminal has a capability to perform the handover where the random access procedure is omitted, from the radio terminal, and if the target cell is a cell of another base station, transmit a handover request message including the capability information, to the other base station.

In the base station according to the first embodiment to the seventh embodiment, the controller is configured to transmit an uplink grant indicating an uplink radio resource to be allocated in the target cell, to the radio terminal.

In the base station according to the first embodiment to the seventh embodiment, if the target cell is a cell of another base station, the controller is configured to: receive the uplink grant from the other base station, and transmit the received uplink grant to the radio terminal.

In the base station according to the second embodiment, the controller is configured to transmit the handover command including a timing advance value or a timing advance group identifier to be applied to the uplink transmission to the target cell, to the radio terminal.

In the base station according to the second embodiment, if the target cell is a cell of another base station, the controller is configured to receive a handover acknowledge message including the timing advance value or the timing advance group identifier, from the other base station.

In the base station according to the second embodiment, if the target cell is a cell of another base station, the controller is configured to transmit, a handover request message including speed information indicating a moving speed of the radio terminal, to the other base station.

In the base station according to the third embodiment, the controller is configured to transmit a handover request message including buffer state information indicating a data amount accumulated in a transmission buffer of the radio terminal, to the other base station.

In the base station according to the fourth embodiment, the controller is configured to transmit the handover command including configuration information of a secondary cell to be added to the target cell, and an activation indication to activate the secondary cell, to the radio terminal.

In the base station according to the fourth embodiment, if the target cell is a cell of another base station, the controller is configured to receive a handover acknowledge message including the configuration information and the activation indication from the other base station.

In the base station according to the fifth embodiment, together with a secondary base station, the base station has a dual connection with the radio terminal. The controller is configured to transmit the handover command including secondary base station information for omitting a random access procedure to a cell of the secondary base station, to the radio terminal.

In the base station according to the fifth embodiment, if the target cell is a cell of another base station, the controller is configured to receive a handover acknowledge message including the secondary base station information, from the other base station.

In the base station according to the sixth embodiment, the controller is configured to transmit, before the handover, instruction information instructing a pre-random access procedure to the target cell, to the radio terminal.

In the base station according to the sixth embodiment, if the target cell is a cell of another base station, the controller is configured to add, before the handover, the other base station as a secondary base station.

A base station (target base station) according the first embodiment to the seventh embodiment manages a target cell of a radio terminal. The base station comprises a controller configured to receive a handover request message from another base station configured to manage a source cell and transmit a handover acknowledge message to the other base station. The handover request message includes capability information indicating that the radio terminal has a capability to perform a handover where a random access procedure is omitted. The handover acknowledge message includes a notification indicating that the random access procedure is omitted during the handover.

In the base station (target base station) according the first embodiment to the seventh embodiment, the controller is configured to transmit to the other base station an uplink grant indicating an uplink radio resource to be allocated, in the target cell, to the radio terminal.

In the base station (target base station) according the second embodiment, the controller is configured to transmit the handover acknowledge message including a timing advance value or a timing advance group identifier to be applied to uplink transmission to the target cell, to the other base station.

In the base station (target base station) according the third embodiment, the handover request message includes speed information indicating a moving speed of the radio terminal. The controller is configured to perform, based on the speed information, at least one of determining whether the handover where the random access procedure is omitted is applied and deciding the timing advance value.

In the base station (target base station) according the third embodiment, the handover request message includes buffer state information indicating a data amount accumulated in a transmission buffer of the radio terminal. The controller is configured to decide, based on the buffer state information, a radio resource to be allocated, in the target cell, to the radio terminal.

In the base station (target base station) according the fourth embodiment, the controller is configured to transmit the handover acknowledge message including configuration information of a secondary cell to be added to the target cell and an activation indication to activate the secondary cell, to the other base station.

In the base station (target base station) according the fifth embodiment, the controller is configured to transmit the handover acknowledge message including secondary base station information for omitting a random access procedure to a cell of a secondary base station, to the other base station.

In the base station (target base station) according the sixth embodiment, before the handover, the controller is configured to perform a pre-random access procedure with the radio terminal.

(Configuration of Mobile Communication System)

The configuration of the mobile communication system according to the embodiment will be described. FIG. 1 is a diagram illustrating a configuration of a Long Term Evolution (LTE) system being a mobile communication system according to an embodiment. As illustrated in FIG. 1, the LTE system includes a User Equipment (UE) 100, an Evolved-UMTS Terrestrial Radio Access Network (E-UTRAN) 10, and an Evolved Packet Core (EPC) 20.

The UE 100 corresponds to a radio terminal. The UE 100 is a mobile communication apparatus. The UE 100 performs radio communication with a cell (serving cell).

The E-UTRAN 10 corresponds to a radio access network. The E-UTRAN 10 includes an evolved Node-B (eNB) 200. The eNB 200 corresponds to a base station. The eNBs 200 are connected to each other via an X2 interface.

The eNB 200 manages one or a plurality of cells. The eNB 200 performs radio communication with the UE 100 that has established connection with the own cells. The eNB 200 has a radio resource management (RRM) function, a routing function of user data (hereinafter, simply referred to as "data"), a measurement control function for mobility control and scheduling, and the like. The "cell" is used as a term indicating the minimum unit of a radio communication area. The "cell" is also used as a term indicating a function of performing radio communication with the UE 100.

The EPC 20 corresponds to a core network. The EPC 20 includes a Mobility Management Entity (MME)/Serving-Gateway (S-GW) 300. The MME performs various types of mobility control for the UE 100, and the like. The S-GW performs transfer control of data. The MME/S-GW 300 is connected with the eNB 200 via an S1 interface.

Figure 2:
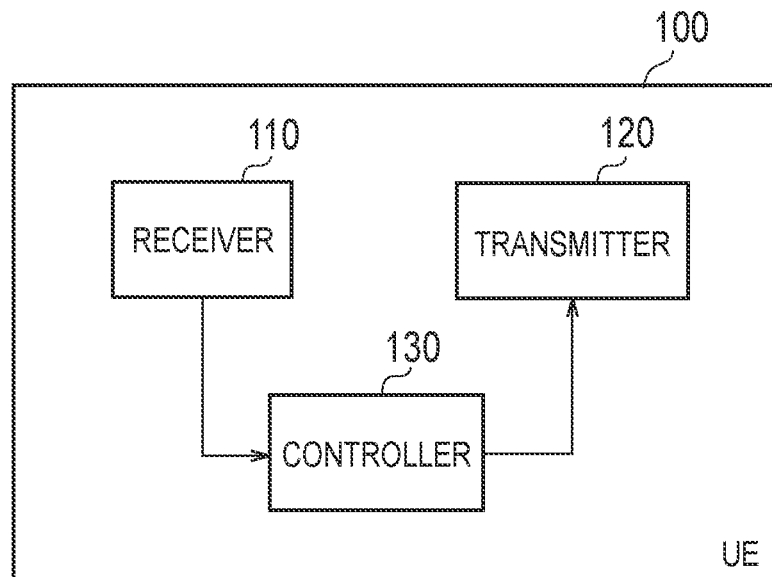
FIG. 2 is a diagram illustrating a configuration of a UE (radio terminal).

FIG. 2 is a diagram illustrating configuration of the UE 100 (radio terminal). As illustrated in FIG. 2, the UE 100 includes a receiver 110, a transmitter 120, and a controller 130.

The receiver 110 performs various types of reception under the control of the controller 130. The receiver 110 includes an antenna and a receiving device. The receiving device converts a radio signal received by the antenna, into a baseband signal (reception signal). The receiving device outputs the baseband signal to the controller 130.

The transmitter 120 performs various types of transmission under the control of the controller 130. The transmitter 120 includes an antenna and a transmission device. The transmission device converts a baseband signal (transmission signal) output by the controller 130, into a radio signal. The transmission device transmits the radio signal from the antenna.

The controller 130 performs various types of control in the UE 100. The controller 130 includes a processor and a memory. The memory stores a program to be executed by the processor, and information to be used in processing performed by the processor. The processor includes a baseband processor and a central processing unit (CPU). The baseband processor performs modulation/demodulation and encoding/decoding of a baseband signal, and the like. The CPU executes programs stored in the memory, to perform various types of processing. The processor may include a codec that performs encoding/decoding of an audio/video signal. The processor executes processes to be described later.

Figure 3:
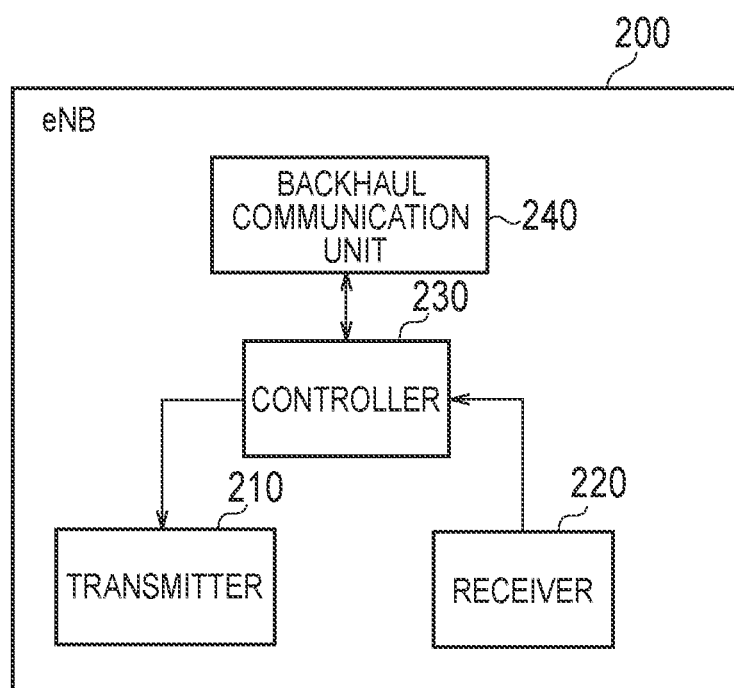
FIG. 3 is a diagram illustrating a configuration of an eNB (base station).

FIG. 3 is a diagram illustrating configuration of the eNB 200 (base station). As illustrated in FIG. 3, the eNB 200 includes a transmitter 210, a receiver 220, a controller 230, and a backhaul communication unit 240.

The transmitter 210 performs various types of transmission under the control of the controller 230. The transmitter 210 includes an antenna and a transmission device. The transmission device converts a baseband signal (transmission signal) output by the controller 230, into a radio signal. The transmission device transmits the radio signal from the antenna.

The receiver 220 performs various types of reception under the control of the controller 230. The receiver 220 includes an antenna and a receiving device. The receiving device converts a radio signal received by the antenna, into a baseband signal (reception signal). The receiving device outputs the baseband signal to the controller 230.

The controller 230 performs various types of control in the eNB 200. The controller 230 includes a processor and a memory. The memory stores a program to be executed by the processor, and information to be used in processing performed by the processor. The processor includes a baseband processor and a central processing unit (CPU). The baseband processor performs modulation/demodulation and encoding/decoding of a baseband signal, and the like. The CPU executes programs stored in the memory, to perform various types of processing. The processor executes the processer to be described later.

The backhaul communication unit 240 is connected with an adjacent eNB 200 via the X2 interface. The backhaul communication unit 240 is connected with the MME/S-GW 300 via the S1 interface. The backhaul communication unit 240 is used for communication performed on the X2 interface, communication performed on the S1 interface, and the like.

Figure 4:
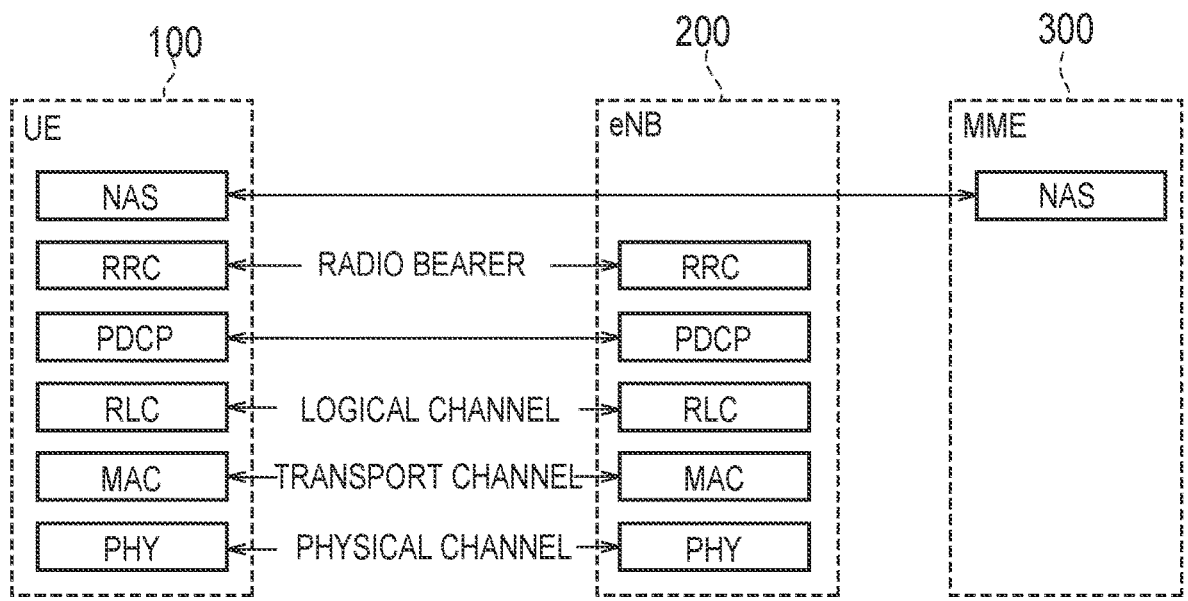
FIG. 4 is a diagram illustrating a configuration of a protocol stack of a radio interface in the LTE system.

FIG. 4 is a diagram illustrating protocol stack of a radio interface in the LTE system. As illustrated in FIG. 4, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control information are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control information are transferred via a transport channel. The MAC layer of the eNB 200 includes a scheduler. The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control information are transferred via a logical channel.

The PDCP layer performs header compression/decompression, and encryption/decryption.

The RRC layer is defined only in a control plane handling control information. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected mode. If there is not a connection (RRC connection) between the RRC of the UE 100 and the RRC of the eNB 200, the UE 100 is in an RRC idle mode.

A non-access stratum (NAS) layer located above the RRC layer performs session management, mobility management, and the like.

Figure 5:
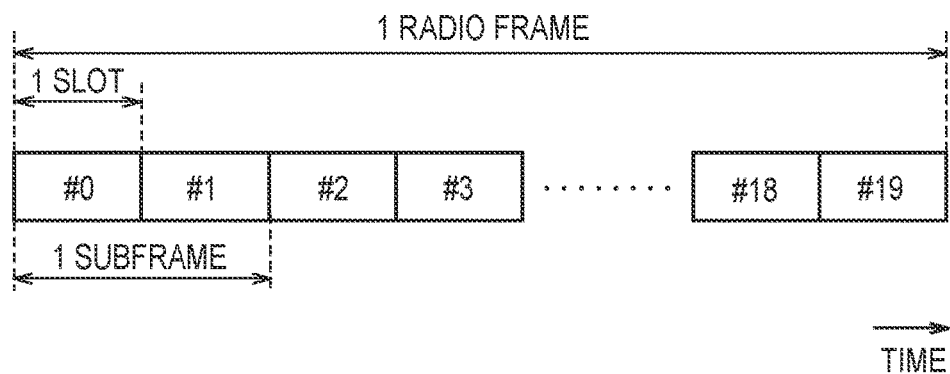
FIG. 5 is a diagram illustrating a configuration of a radio frame used in the LTE system.

FIG. 5 is a configuration diagram of a radio frame used in the LTE system. In the LTE system, Orthogonal Frequency Division Multiple Access (OFDMA) is applied to downlink. In the LTE system, Single Carrier Frequency Division Multiple Access (SC-FDMA) is applied to uplink.

As illustrated in FIG. 5, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier. In addition, among radio resources (time/frequency resources) to be allocated to the UE 100, a frequency resource can be identified by resource blocks and a time resource can be identified by subframes (or slots).

In downlink, a section corresponding to beginning several symbols of each subframe is a region used as a physical downlink control channel (PDCCH) for transferring mainly downlink control information, and a physical HARQ Indicator channel (PHICH) for transferring HARQ ACK/NACK. In addition, a remaining part of each subframe is a region that can be used as a physical downlink shared channel (PDSCH) for transferring mainly downlink data.

Basically, the eNB 200 transmits downlink control information (DCI) to the UE 100 using the PDCCH. Basically, the eNB 200 transmits downlink data to the UE 100 using the PDSCH. The downlink control information conveyed by the PDCCH includes uplink scheduling information, downlink scheduling information, and a TPC command. The uplink scheduling information is scheduling information (UL grant) related to the allocation of an uplink radio resource, and the downlink scheduling information is scheduling information related to the allocation of a downlink radio resource. The TPC command is information instructing the increase and decrease of transmission power of the uplink. For identifying a UE 100 which is a transmission destination of downlink control information, the eNB 200 includes a CRC bit scrambled using an identifier (Radio Network Temporary ID (RNTI)) of the transmission destination UE 100, in the downlink control information. For downlink control information that has a possibility of being addressed to an own UE, each UE 100 descrambles the CRC bit using the RNTI of the own UE. After the descrambling, each UE 100 performs CRC check, and thereby blind decodes the PDCCH, to detect downlink control information addressed to the own UE. The PDSCH conveys downlink data using a downlink radio resource (resource block) indicated by the downlink scheduling information.

In uplink, both end portions in the frequency direction of each subframe are regions used as a physical uplink control channel (PUCCH) for transferring mainly uplink control information. A remaining part of each subframe is a region that can be used as a physical uplink shared channel (PUSCH) for transferring mainly uplink data.

Basically, the UE 100 transmits uplink control information (UCI) to the eNB 200 using the PUCCH. Basically, the UE 100 transmits uplink data to the eNB 200 using the PUSCH. The uplink control information carried by the PUCCH includes a Channel Quality Indicator (CQI), a Precoding Matrix Indicator (PMI), a Rank Indicator (RI), a Scheduling Request (SR), and the HARQ ACK/NACK. The CQI is an index indicating channel quality of the downlink, and is used for deciding an MCS to be used in downlink transfer, and the like. The PMI is an index indicating a precoder matrix desirably used for transferring the downlink. The RI is an index indicating the number of layers (the number of streams) that can be used for transferring the downlink. The SR is information requesting the allocation of the PUSCH resource. The HARQ ACK/NACK is delivery confirmation information indicating whether downlink data has been correctly received.

(General Random Access Procedure)

Figure 6:
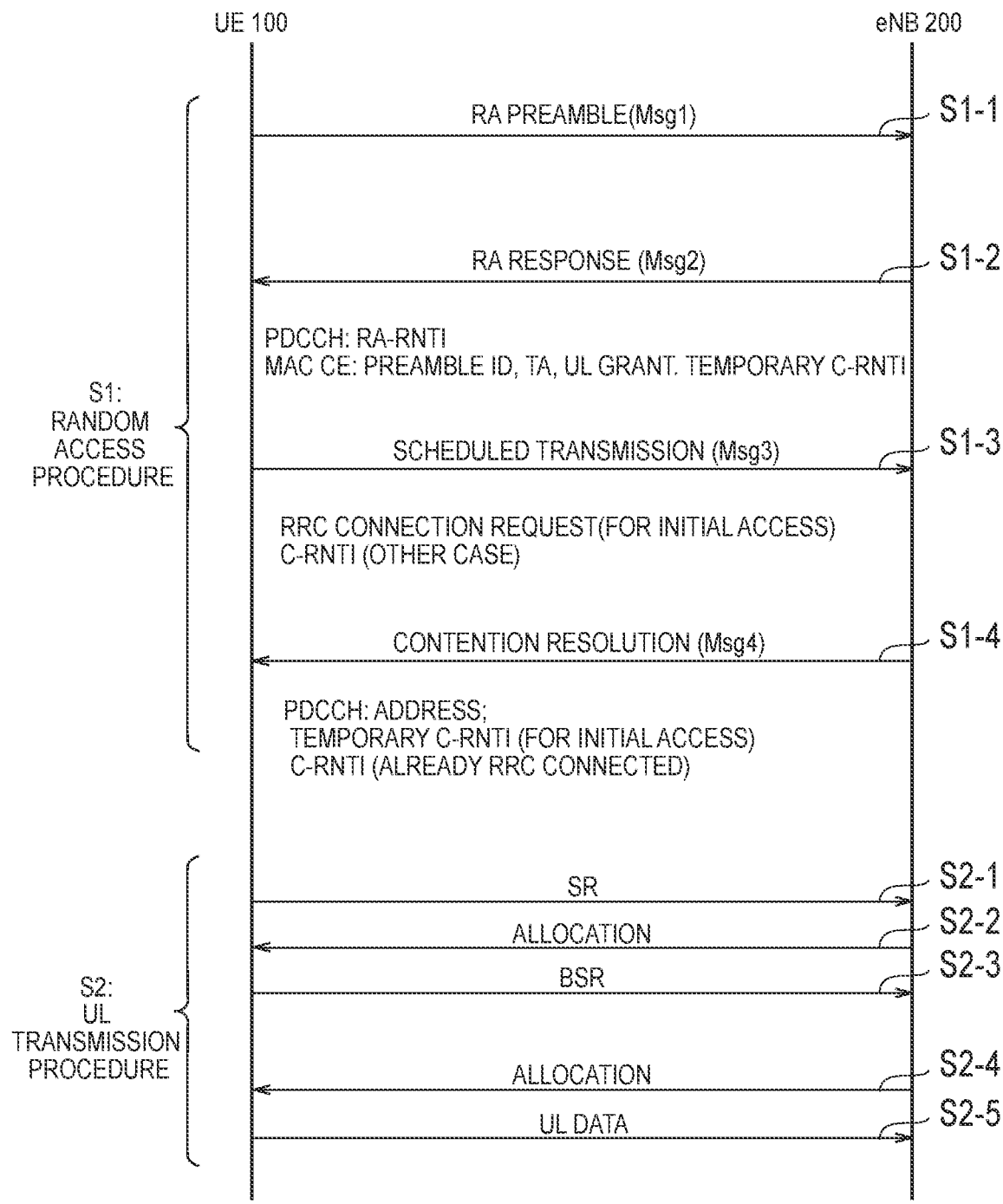
FIG. 6 is a chart illustrating a sequence of a general random access procedure and an uplink transmission procedure.

A general random access procedure will be described, below. FIG. 6 is a chart illustrating a sequence of the general random access procedure and an uplink transmission procedure. In an initial state in FIG. 6, the UE 100 is in an RRC connected mode or an RRC idle mode.

As illustrated in FIG. 6, if the uplink synchronization state is non-synchronized (Non-synchronised), the UE 100 in the RRC connected mode performs the random access procedure to perform uplink transmission (step S1). The UE 100 in the RRC idle mode performs the random access procedure (step S1) to perform an initial connection (Initial access). The UE 100 performs the uplink transmission procedure (step S2) after an end of the random access procedure (step S1) to thereby transmit the uplink data (UL data) to the eNB 200.

The random access procedure (step S1) will be described. Step S1 is comprised of steps S1-1 to S1-4.

In step S1-1, the UE 100 transmits, as a first process of the random access procedure, the random access preamble (RA Preamble) on a physical random access channel (PRACH) to eNB 200. The "RA Preamble" may be referred to as Msg 1. The "RA Preamble" is a signal for performing a random access to the eNB 200 from the UE 100 in the MAC layer. The eNB 200 receives the "RA Preamble".

In step S1-2, the eNB 200 transmits, as a second process of the random access procedure, a random access response (RA Response) to the UE 100 on a downlink shared channel (DL-SCH). The "RA Response" is one of the MAC control elements (MAC CE), and may be referred to as Msg 2. The eNB 200 estimates an uplink delay with the UE 100, based on the "RA Preamble" received from the UE 100. Further, the eNB 200 decides an uplink radio resource to be allocated to the UE 100. Then the eNB 200 transmits the "RA Response" including a timing advance value (TA: Timing Advance) or timing correction value based on a result of the delay estimation, allocation information (UL grant) of the uplink radio resource, a preamble identifier (Preamble ID), and "Temporary C-RNTI", to the UE 100. It is noted that the "Preamble ID" is ID indicating a signal sequence of the "RA Preamble" received from the UE 100. Further, in the physical layer (PDCCH), a dedicated RNTI (RA-RNTI) is used for transmitting the "RA Response". The UE 100 receives the "RA Response".

In step S1-3, the UE 100 performs, as a third process of the random access procedure, uplink transmission (Scheduled Transmission) to the eNB 200 on the uplink shared channel (UL-SCH) based on the "RA Response". The "Scheduled Transmission" may be referred to as Msg 3. In a case of the initial connection (Initial access), the "Scheduled Transmission" is an "RRC Connection Request" message. Otherwise, (that is, if the C-RNTI is assigned to the UE 100), the "Scheduled Transmission" is a message (or data) including the C-RNTI of the UE 100. The case where the C-RNTI is assigned to the UE 100 includes a case where the UE 100 performs the handover or the like. The eNB 200 receives the "Scheduled Transmission".

In step S1-4, the eNB 200 transmits, as a fourth process of the random access procedure, a contention resolution (Contention Resolution) message to the UE 100. The "Contention Resolution" message may be referred to as Msg 4. The "Contention Resolution" message includes a content of the message received from the UE 100 in step S1-3. In a case of the Initial access, in the physical layer (PDCCH), the "Temporary C-RNTI" is used for transmitting the "Contention Resolution" message. If the C-RNTI is assigned to the UE 100, in the physical layer (PDCCH), the "C-RNTI" is used for transmitting the "Contention Resolution" message. The UE 100 receives the "Contention Resolution" message.

The uplink transmission procedure (step S2) will be described. Step S2 is comprised of steps S2-1 to S2-5.

In step S2-1, the UE 100 transmits an SR for requesting allocation of the PUSCH resource, to the eNB 200, on the PUCCH.

In step S2-2, the eNB 200 allocates the PUSCH resource to the UE 100, in response to reception of the SR. Specifically, the eNB 200 transmits the DCI including the uplink scheduling information (UL grant) on the PDCCH to the UE 100.

In step S2-3, the UE 100 uses the PUSCH resource allocated from the eNB 200 to transmit to the eNB 200 a BSR including buffer information indicating an amount of the uplink data in a transmission buffer of the UE 100.

In step S2-4, the eNB 200 allocates an appropriate amount of a PUSCH resource to the UE 100, in response to reception of the BSR. Specifically, the eNB 200 transmits the DCI including the uplink scheduling information (UL grant) on the PDCCH to the UE 100.

In step S2-5, the UE 100 uses the PUSCH resource allocated from the eNB 200 to transmit to the eNB 200 the uplink data in the transmission buffer of the UE 100.

First Embodiment

A first embodiment will be described. In the first embodiment, by realizing the handover where at least part of the random access procedure is omitted, it is possible to shorten a communication interruption time period resulting from the random access procedure at the time of the handover. Hereinafter, the handover where the random access procedure is omitted is referred to as "RACH-less HO". The "RACH-less HO" according to the first embodiment is a handover where the Msg 1 (RA Preamble) of S1-1 and the Msg 2 (RA Response) of S1-2 of FIG. 6 are omitted.

In the first embodiment, mainly a case is assumed where the source cell and the target cell belong to different eNBs 200. Such a handover may be referred to as "inter eNB handover". Hereinafter, the eNB 200 to which the source cell belongs is referred to as "source eNB (Source eNB) 200-1". Further, the eNB 200 to which the target cell belongs is referred to as "target eNB (Target eNB) 200-2".

In the first embodiment, a network synchronized with each cell is mainly assumed. Such a network may be referred to as "synchronous network".

Figure 7:
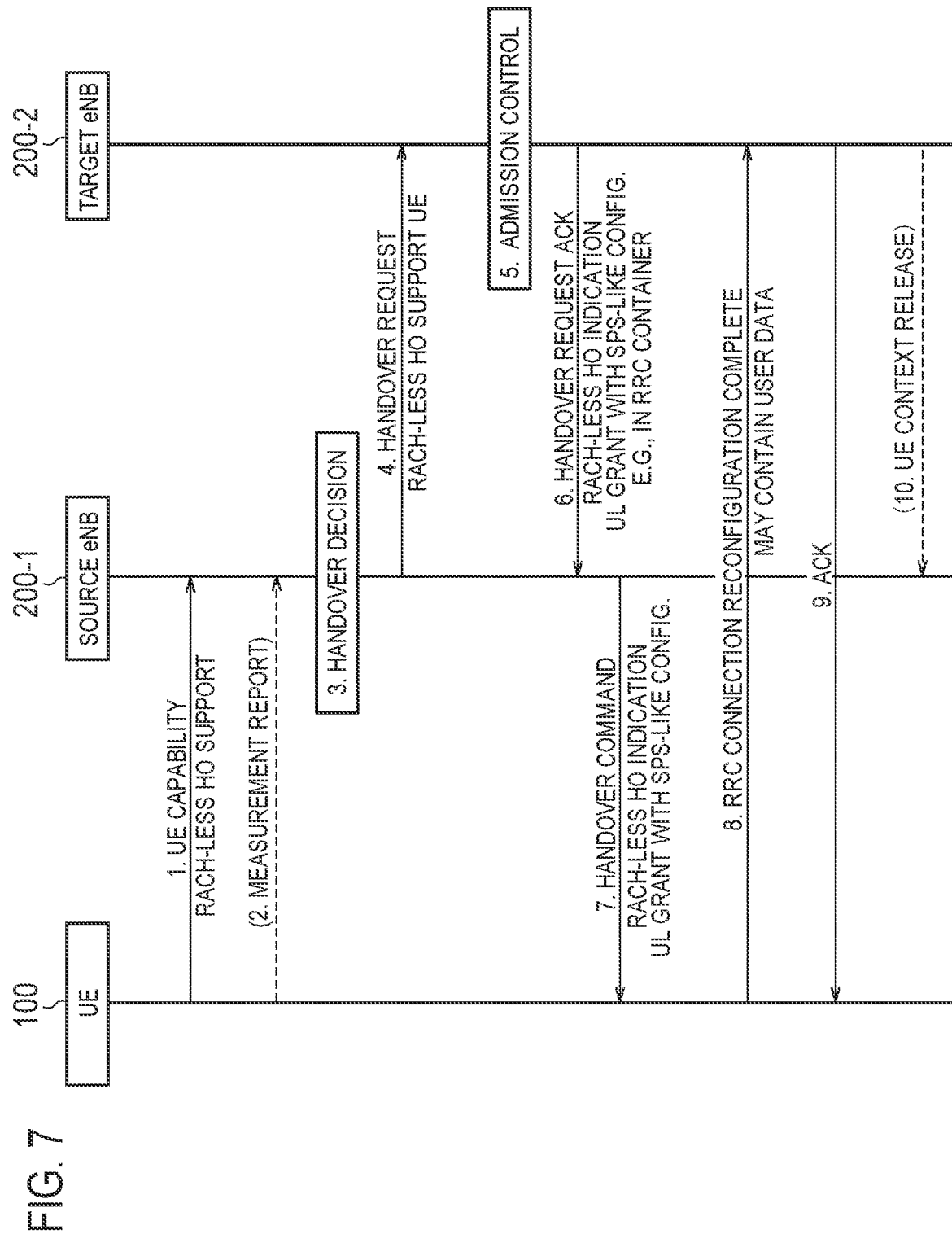
FIG. 7 is a chart illustrating a handover sequence according to a first embodiment.

FIG. 7 is a chart illustrating a handover sequence according to the first embodiment. The handover sequence according to the first embodiment is a base sequence for a handover sequence according to second to sixth embodiments. In the following sequence diagram, a signaling indicated by a broken line indicates optional.

As illustrated in FIG. 7, in step 1, the UE 100 transmits, before the handover, capability information indicating that the UE 100 has a capability to perform the RACH-less HO (RACH-less HO support), to the source eNB 200-1. The capability information is included in UE Capability or RRC signaling, for example. The capability information is used to determine whether to apply the RACH-less HO. The UE 100 may transmit, instead of the capability information, a notification indicating that the UE 100 desires to apply the RACH-less HO. The notification (desire notification) may be combined with a measurement report of step 2. For example, the UE 100 may transmit the notification (desire notification), based on a synchronization state between the source cell and the target cell. The synchronization state includes H-SFN (Hyper-System Frame Number), SFN (System Frame Number), an error measurement of the subframe number or the like. A threshold value of the synchronization state (for example, a maximum allowable error value of the SFN) may be previously set from the eNB 200 to the UE 100. The UE 100 may transmit a notification indicating that the UE 100 desires to apply the RACH-less HO in response to the synchronization state (synchronization error) between the source cell and the target cell being smaller than the threshold value.

In step 2, the UE 100 transmits the measurement report (Measurement report) to the source eNB 200-1. The measurement report includes a measurement result of the source cell and/or the target cell. The measurement report is used for a handover decision (Handover decision) in step 3.

Steps 3 to 6 correspond to a preparation phase of the handover. In step 3, the source eNB 200-1 decides to perform the handover of the UE 100. The source eNB 200-1 confirms, based on the capability information (or the desire notification), that the UE 100 supports the RACH-less HO.

In step 4, the source eNB 200-1 transmits a handover request message (HO Request) to the target eNB 200-2. If the UE 100 supports (or desires) the RACH-less HO, the source eNB 200-1 notifies the target eNB 200-1 that the UE 100 supports the RACH-less HO (that is, the RACH-less HO is possible). Specifically, the source eNB 200-1 transmits to the target eNB 200 a handover request message including the capability information (RACH-less HO support UE) indicating that the UE 100 has the capability to perform the RACH-less HO.

In step 5, the target eNB 200-2 decides to accept the handover, based on the handover request message. In a case of the UE 100 having the capability to perform the RACH-less HO, the target eNB 200-2 determines whether to accept the RACH-less HO. In this determination, the target eNB 200-2 may consider history information of the handover to the own cell (the target cell) in a constant period in the past. Specifically, in the handover where the random access procedure is not omitted (that is, a conventional handover sequence), the target eNB 200-2 records the timing advance value decided by the random access procedure. If a variation of the timing advance value in a constant period in the past (for example, last 10 minutes or the like) is contained within a constant range, the target eNB 200-2 determines that the RACH-less HO is possible. Here, description proceeds with an assumption that the target eNB 200-2 determines that the RACH-less HO is possible.

In step 6, the target eNB 200-2 transmits a handover acknowledge message (HO Request ACK) to the source eNB 200-1. If determining that the RACH-less HO is possible, the target eNB 200-2 includes a notification with an indication that the UE 100 performs the RACH-less HO (RACH-less HO indication) and/or the uplink grant (UL grant), into the handover acknowledge message. For example, the target eNB 200-2 includes, as an RRC container (RRC container), the notification with an indication that the UE 100 performs the RACH-less HO and the uplink grant, into the handover acknowledge message. The RRC container is to be notified to the UE 100 via the source eNB 200-1.

It may be possible to use an implicit notification indicating that the RACH-less HO is performed, without using an explicit notification (RACH-less HO indication) indicating that the RACH-less HO is performed. For example, it may be possible to use the uplink grant as the implicit notification indicating that the RACH-less HO is performed.

The uplink grant indicates an uplink radio resource to be allocated to the UE 100 in the target cell. The uplink grant may include information on a period during which the target eNB 200-2 secures the uplink radio resource. In this case, the target eNB 200-2 uses scheduling that resembles a semi-persistent scheduling (SPS). Examples of the information on the period during which the uplink radio resource is secured (SPS-like config.) include at least one of a starting system frame number (SFN), a starting subframe number, an end system frame number (SFN), an end sub frame number, and a timer value corresponding to the period. During the period, the target eNB 200-2 is (continuously) allocating the uplink radio resource to the UE 100.

If the target eNB 200-2 determines that the RACH-less HO is not possible, the information as described above is not included in the handover acknowledge message. In this way, the source eNB 200-1 may be implicitly notified that the conventional handover sequence is applied.

In step 7, the source eNB 200-1 transmits a handover command (Handover Command) to the UE 100. The handover command includes a notification indicating the RACH-less HO (RACH-less HO indication) and the uplink grant (UL grant).

In step 8, in response to the notification indicating the RACH-less HO, the UE 100 omits the random access procedure to the target eNB 200-2. The UE 100 performs the uplink transmission to the target eNB 200-2 by using the uplink radio resource indicated by the uplink grant. The uplink transmission corresponds to the Msg 3 (Scheduled Transmission) of S1-3 in FIG. 6.

In step 9, if successful in uplink reception within a period during which the uplink radio resource is secured, the target eNB 200-2 transmits an ACK to the UE 100. Once the ACK is transmitted, the uplink resource is (implicitly) released, and the target eNB 200-2 may return to a normal allocation sequence. If not successful in the uplink reception within the period during which the uplink radio resource is secured, the target eNB 200-2 transmits a NACK to the UE 100. Once the NACK is transmitted, the uplink resource is (implicitly) released, and the target eNB 200-2 may return to the normal allocation sequence. Upon receiving the NACK, the UE 100 may start the random access to the target eNB 200-2 by using the general random access procedure.

In step 10, the target eNB 200-2 transmits a release message (UE Context Release) indicating a release of context information of the UE 100, to the source eNB 200-1.

Modification of First Embodiment

In the embodiment described above, the synchronous network is mainly assumed. However, it may be possible to apply the RACH-less HO to a network where each cell is not fully synchronized.

If the system frame number or the subframe number does not match between adjacent cells, the source cell notifies the UE 100 of a subframe number difference (n') from the target cell, during the resource allocation. The UE 100 decides a Msg 3 transmission timing in the target cell, in consideration of n'. Alternatively, in a synchronization signal detection, the UE 100 previously detects the subframe number difference (n') between the source cell and the target cell. The UE 100 decides the Msg 3 transmission timing in the target cell, in consideration of n'. Specifically, in a conventional specification, if the Msg 2 is received in a subframe n, the Msg 3 is transmitted in n+k1 (k1>6); however, in a specification in this modification, the Msg 3 is transmitted in n+n'+k1.

As norms when the UE 100 calculates the subframe number difference (n'), the following norms 1) to 4) may be listed.

1) A difference (m−n) between a subframe n of the source cell and a subframe m of the target cell where a start timing is begun within ±X microseconds or less from a start timing of the subframe n of the source cell. However, if a subframe boundary is not present within that range, an indication that the RACH-less HO is not performed may be notified from the UE 100 to the network.

2) A difference (m−n) between the subframe n of the source cell and the subframe m where the start timing is begun only after before X microseconds or less from the start timing of the subframe n of the source cell.

3) A difference (m−n) between the subframe n of the source cell and the subframe m where the start timing is begun only after the start timing of the subframe n of the source cell.

4) A difference (m−n) between the subframe n of the source cell and the subframe m where the start timing is begun only after X microseconds from the start timing of the subframe n of the source cell.

If a DL timing is not synchronized between the source cell and the target cell, the UE 100 is synchronized with the DL timing (the SFN, the subframe number or the like) of the target cell, and then, UL transmission may be implemented (step 8).

As an application condition for the RACH-less HO, the synchronous network is not essential, but a condition that the DL timing is within a constant range, a condition that the UL timing (timing advance for the DL timing) is within an error, or the like may be listed.

Second Embodiment

A second embodiment will be described with a particular focus on a difference from the first embodiment.

Figure 8:
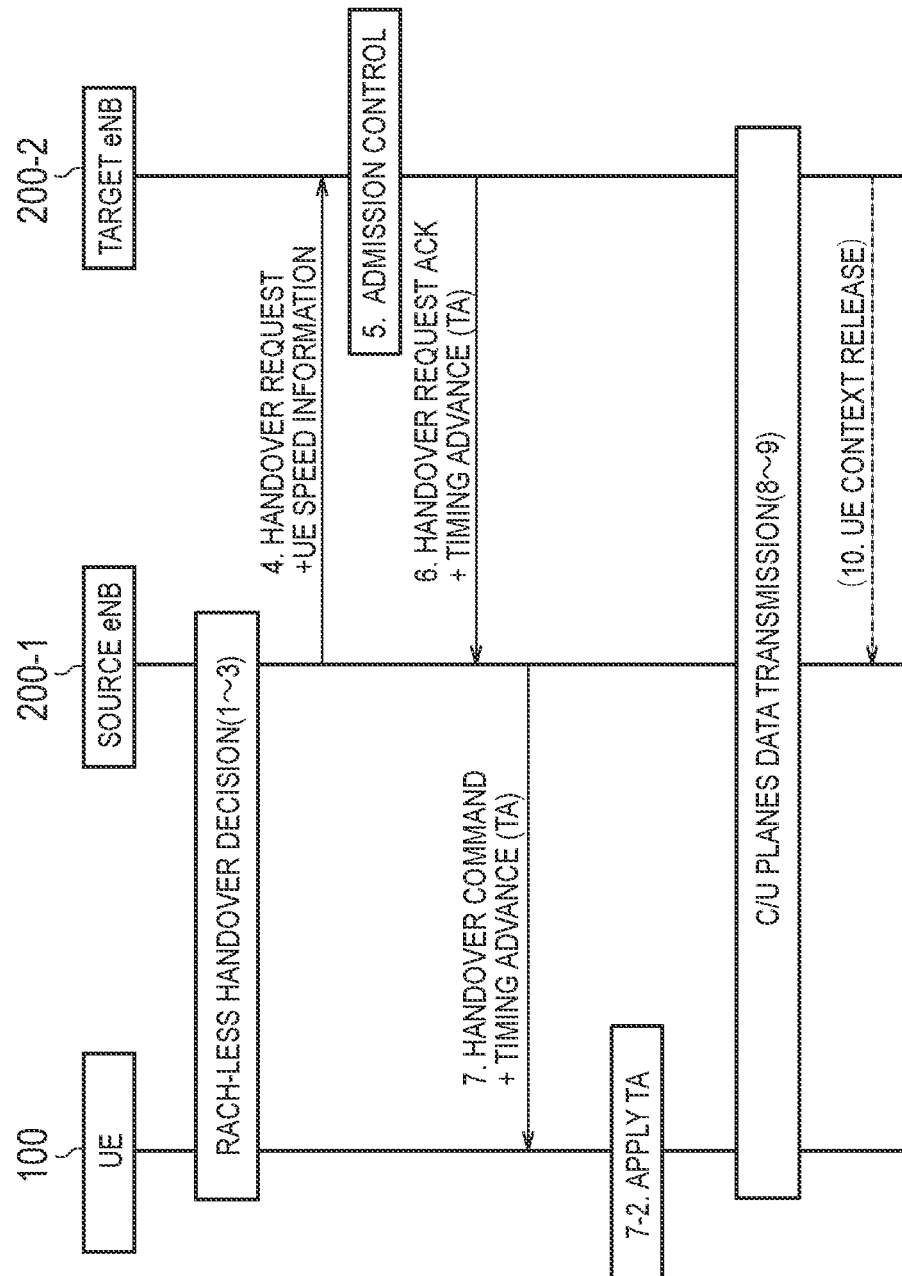
FIG. 8 is a chart illustrating a handover sequence according to a second embodiment.

FIG. 8 is a chart illustrating a handover sequence according to a second embodiment.

As illustrated FIG. 8, steps 1 to 3 are similar to those in the handover sequence according to the first embodiment. an indication that the RACH-less HO is not performed may be notified from the UE 100 to the network.

In step 4, the source eNB 200-1 notifies the target eNB 200-2 of speed information (UE speed information) indicating a moving speed of the UE 100. Specifically, the source eNB 200-1 transmits a handover request message (Handover Request) including the speed information to the target eNB 200-2. The speed information is not essential, and the source eNB 200-1 may transmit the handover request message not including the speed information to the target eNB 200-2.

In step 5, the target eNB 200-2 performs a handover acceptance determination (Admission Control). The target eNB 200-2 decides the timing advance value (TA) if accepting the RACH-less HO.

In deciding the timing advance value, the target eNB 200-2 uses history information of the handover to the own cell (the target cell) in a constant period in the past. Specifically, in the handover where the random access procedure is not omitted (that is, the conventional handover sequence), the target eNB 200-2 records the timing advance value decided by the random access procedure. Then, the target eNB 200-2 decides, as the timing advance value to be set to the UE 100, an average of the timing advance values set to the UE handed over from the source eNB 200-1. Instead of the average value, a maximum value, a minimum value and the like may be used.

In deciding the timing advance value, the target eNB 200-2 may consider the speed information of the UE 100. For example, the target eNB 200-2 individually manages (saves) the histories of the past timing advance values for each moving speed and refers to the history corresponding to the moving speed of the UE 100 this time to decide the timing advance value to be set to the UE 100. If the moving speed of the UE 100 exceeds a certain constant value, the target eNB 200-2 may determine to use the conventional handover sequence rather than the RACH-less HO.

In step 6, the target eNB 200-2 uses the handover acknowledge message to notify the source eNB 200-1 of the decided timing advance value. For example, the target eNB 200-2 includes the timing advance value, into the RRC container.

In step 7, the source eNB 200-1 transmits the handover command (Handover Command) including the timing advance value to be applied to the uplink transmission to the target cell, to the UE 100.

In step 7-2, the UE 100 applies the timing advance value and adjusts the uplink transmission timing to the target eNB 200-2. The UE 100 applies the timing advance value based on the DL timing of the target eNB 200-2.

Steps 8 to 10 are similar to those in the handover sequence according to the first embodiment.

First Modification of Second Embodiment

In the second embodiment, if the UE 100 already has a plurality of timing advance groups (TAGs), it may be possible to designate, in the handover command, an ID of the TAG (timing advance group identifier) rather than the timing advance value. This is effective if, for example, the UE 100 performs carrier aggregation (CA) or dual connection (DC: Dual Connectivity) before the handover and performs an intra-eNB handover. The case of the CA and the DC will be described in fourth to fifth embodiments.

If the timing advance group identifier is included in the handover command, the UE 100 uses the timing advance value corresponding to the timing advance group identifier to adjust the uplink transmission timing to the target cell (target eNB 200-2).

Second Modification of Second Embodiment

In the second embodiment, the source eNB 200-1 may acquire speed information (hereinafter, referred to as "UE speed information") of the UE 100, from the UE 100. The source eNB 200-1 may acquire not only the UE speed information but also another auxiliary information from the UE 100.

In this modification, the measurement report of step 2 will be improved as follows.

A first method is a method of applying the UE speed information to a mechanism of Immediate MDT (Minimization of Drive Test). In the Immediate MDT, the UE 100 includes UE location information into the measurement report depending on a setting from the eNB 200. In the first method, the eNB 200 sets the UE 100 to include the UE speed information into the measurement report. The UE 100 includes the UE speed information into the measurement report depending on the setting from the eNB 200. In the first method, the measurement report is an event trigger type, and an existing trigger event is used. The UE speed information may include immediate data (for example, x km/h), and may also be an index value (for example, High, low, mid).

A second method is a method of including a radio wave arrival direction (AoA Angle of Arrival) of a cell in which the measurement report is triggered and the UE speed information, into the measurement report. The AoA may be an angle ([°]), or may be a precoder weight (or an index of a defined matrix) format such as PMI. The eNB 200 notifies the UE 100 of a list of an identifier of a cell subject to the AoA/UE speed information. For example, measurement configuration information (Measurement configuration) is included in the list. Only if designated by the measurement configuration information, the UE 100 may include the AoA and/or the UE speed information into the measurement report. If the identifier of the cell in which an A3 trigger is applied is included in the list, the UE 100 transmits, together with a cell measurement result (Measurement result), the AoA and the speed information of the UE 100, to the eNB 200.

Third Embodiment

A third embodiment will be described with a particular focus on a difference from the first and second embodiments.

Figure 9:
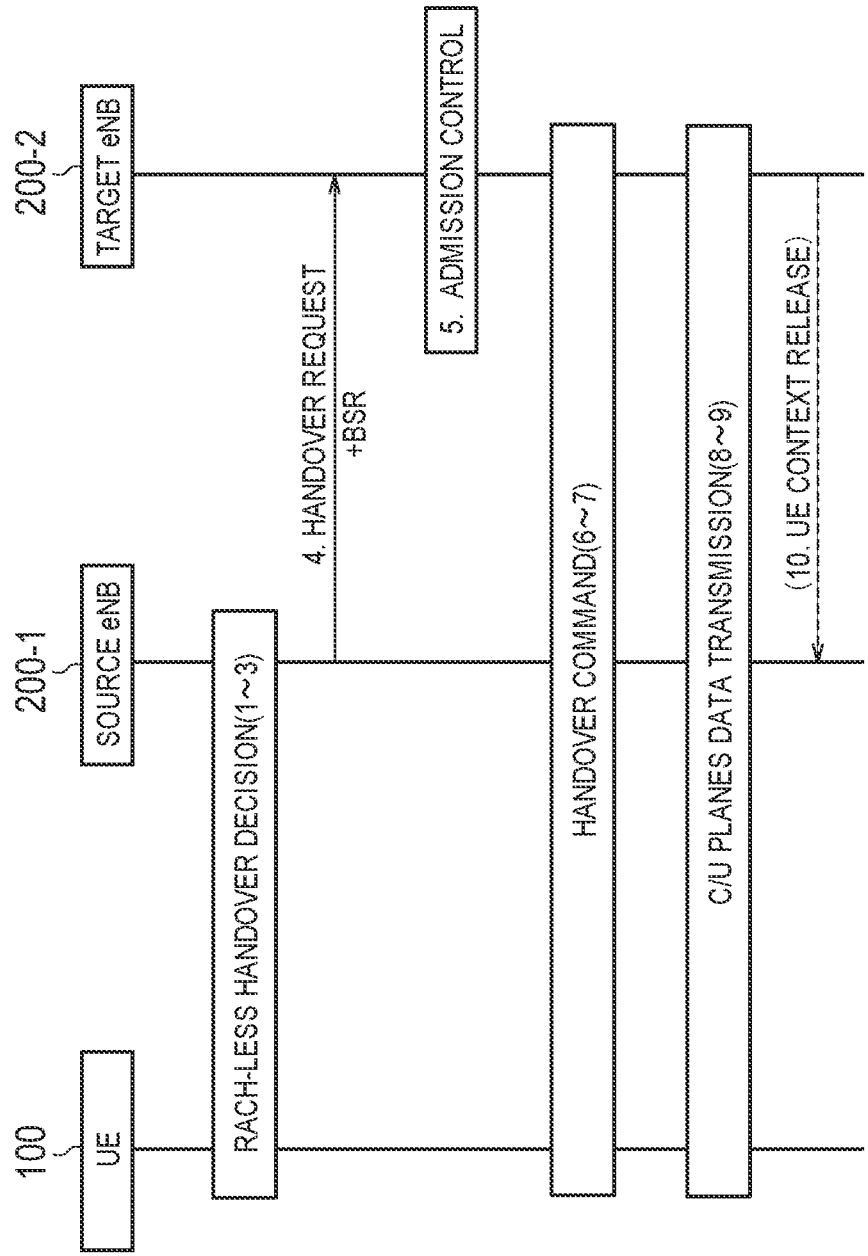
FIG. 9 is a chart illustrating a handover sequence according to a third embodiment.

FIG. 9 is a chart illustrating the handover sequence according to the third embodiment.

As illustrated in FIG. 9, steps 1 to 3 are similar to those in the handover sequence according to the first embodiment.

As illustrated in FIG. 9, in step 4, the source eNB 200-1 transmits a handover request message including buffer state information indicating a data amount accumulated in the uplink buffer of the UE 100, to the target eNB 200-2. The source eNB 200-1 has previously received a BSR (Buffer Status Report) from the UE 100, and may directly transmit, as the buffer state information, the latest BSR received from the UE 100 to the target eNB 200-2. The BSR transmitted by the UE 100 includes information on the data amount for each LCG. The source eNB 200-1 may transmit, as the buffer state information, a total of BSRs received from the UE 100 (BSRs of all the LCGs) or a part of the BSR (BSR of a part of the LCG), to the target eNB 200-2. If the source eNB 200-1 receives a BSR (SL BSR) for a sidelink from the UE 100, the source eNB 200-1 may transmit, as the buffer state information, the SL BSR, to the target eNB 200-2. The source eNB 200-1 may predict a traffic generation of the UE 100 from a past BSR history or the like and notify the target eNB 200-2 of the prediction. The source eNB 200-1 may notify the target eNB 200-2 of an uplink grant amount (uplink allocation resource amount). For example, the source eNB 200-1 may notify an allocation resource amount recommended by the source eNB 200-1. For example, the source eNB 200-1 may notify a resource amount required by the target cell for an initial transmission allocation.

In step 5, the target eNB 200-2 performs a handover acceptance determination (Admission Control). If accepting the RACH-less HO, the target eNB 200-2 decides, based on the buffer status information received from the source eNB 200-1, a radio resource to be allocated to the UE 100 in the target cell. The target eNB 200-2 may decide the radio resource amount to be allocated by the uplink grant. The target eNB 200-2 may decide the number of secondary cells (SCell) to be set to the UE 100. A configuration of the secondary cell will be described in a fourth embodiment.

Steps 6 to 10 are similar to those in the handover sequence according to the first embodiment.

According to the third embodiment, the target eNB 200-2 can appropriately decide, based on the radio resource to be allocated to the UE 100, the buffer state information.

Fourth Embodiment

The fourth embodiment will be described with a particular focus on a difference from the first to third embodiments.

The fourth embodiment is an embodiment where the carrier aggregation (CA) is assumed. In the CA, the UE 100 is set with a plurality of cells from one eNB 200. The plurality of cells include one primary cell (PCell) and at least one secondary cell (SCell).

Figure 10:
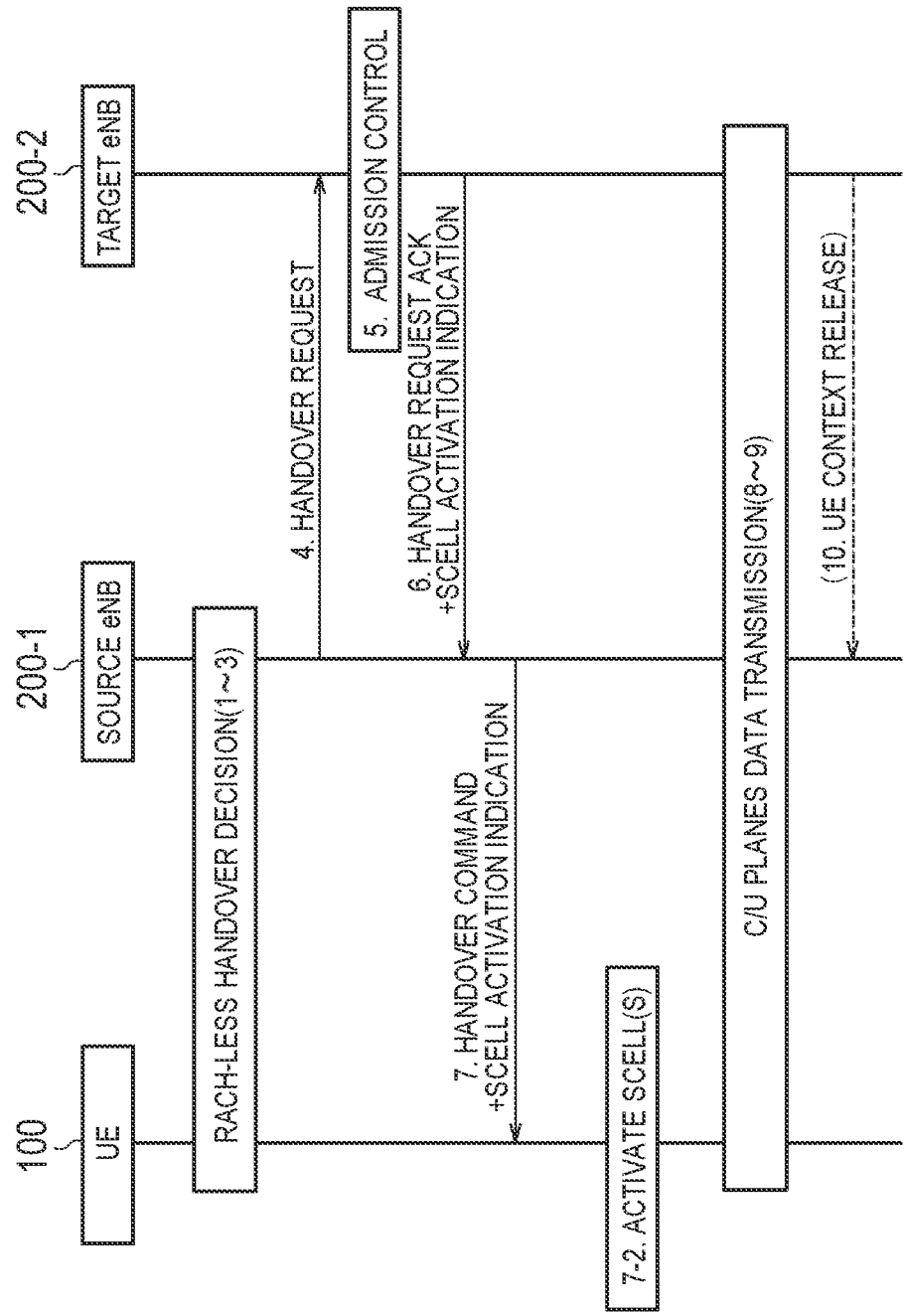
FIG. 10 is a chart illustrating a handover sequence according to a fourth embodiment.

FIG. 10 is a chart illustrating the handover sequence according to the fourth embodiment.

As illustrated in FIG. 10, steps 1 to 4 are similar to those in the handover sequence according to the first embodiment.

In step 5, the target eNB 200-2 performs a handover acceptance determination (Admission Control). The target eNB 200-2 decides the secondary cell to be set to the UE 100 from among the cells of the target eNB 200-2. Specifically, the target cell corresponds to the primary cell (PCell), and the target eNB 200-2 decides the secondary cell (SCell) to be added to the target cell (primary cell). The target eNB 200-2 decides the secondary cell to be activated out of the secondary cells to be set. The target eNB 200-2 may perform these decisions, from the buffer state information (BSR) or the like according to the third embodiment. The target eNB 200-2 may perform these decisions with reference to the setting of the current source eNB 200-1.

In step 6, the target eNB 200-2 transmits a handover acknowledge message (Handover Request ACK) including configuration information of the secondary cell and an activation indication to activate the secondary cell (SCell Activation Indication), to the source eNB 200-1.

The activation indication may be an indication to individually activate the secondary cells to be set. The active indication may be an indication to collectively activate all the secondary cells to be set. If the cells are individually activated, the activation indication may be included while being associated with the configuration information of each secondary cell. The configuration information and the activation indication of the secondary cell may be included in the RRC container.

In step 7, the source eNB 200-1 transmits the handover command (Handover Command) including the configuration information of the secondary cell and the activation indication to activate the secondary cell (SCell Activation Indication), to the UE 100.

In step 7-2, the UE 100 sets the secondary cell in accordance with the configuration information of the secondary cell, and in response to the activation indication, activates the set secondary cell. That is, the UE 100 recognizes the secondary cell specified by the activation indication as being activated simultaneously to the setting (RRC Connection Reconfiguration).

Steps 8 to 10 are similar to those in the handover sequence according to the first embodiment.

It should be noted that in the conventional handover sequence, the target eNB 200-2 activates the secondary cell after the handover. Specifically, in the conventional handover sequence, the target eNB 200-2 transmits the activation indication to the UE 100 by a signaling of the MAC layer.

On the other hand, in the fourth embodiment, the UE 100 activates the secondary cell according to the handover command from the source eNB 200-1. Therefore, according to the fourth embodiment, it is possible to quickly activate the secondary cell as compared to the conventional handover sequence.

Fifth Embodiment

A fifth embodiment will be described with a particular focus on a difference from the first to fourth embodiments.

The fifth embodiment is an embodiment where the dual connection (DC) is assumed. The dual connection is a communication mode in which a master cell group (MCG) and a secondary cell group (SCO) are set to the UE 100. The master cell group is a serving cell group managed by a master eNB (MeNB). The secondary cell group is a serving cell group managed by a secondary eNB (SeNB).

Figure 11:
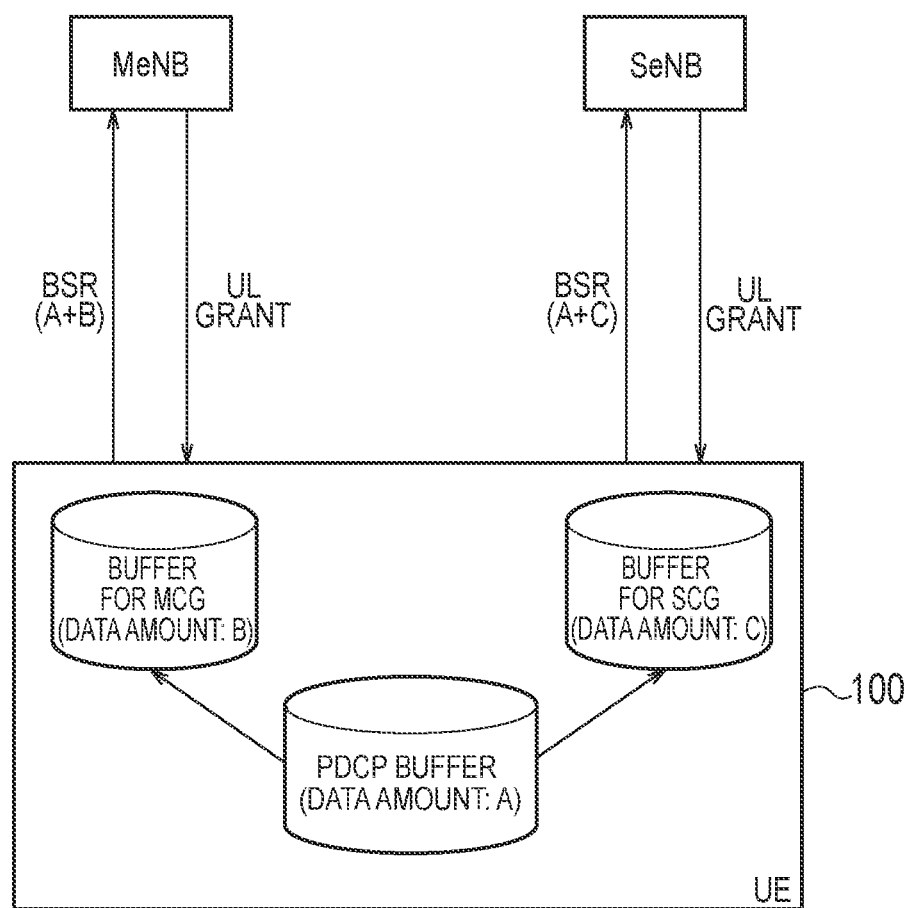
FIG. 11 is a diagram illustrating a double BSR.

In the dual connection, a double BSR may be set to the UE 100. FIG. 11 is a diagram illustrating the double BSR. As illustrated in FIG. 11, if the data amount (PDCP data amount A) accumulated in the PDCP buffer exceeds a threshold value, the UE 100 transmits the BSR to both the MeNB (MCG) and the SeNB (SCO). The threshold value is set for each bearer by an RRC signaling transmitted by the MeNB to the UE 100, for example. If the data amount (PDCP data amount A) accumulated in the PDCP buffer exceeds the threshold value, the UE 100 may transmit the data to both the MeNB (MCG) and the SeNB (SCO). The BSR transmitted by the UE 100 to the MeNB indicates a total (A+B) of the data amount (PDCP data amount A) accumulated in the PDCP buffer and the data amount (data amount B) accumulated in the buffer for the MCG. On the other hand, the BSR transmitted by the UE 100 to the SeNB indicates a total (A+C) of the data amount (PDCP data amount A) accumulated in the PDCP buffer and the data amount (data amount C) accumulated in the buffer for the SCG. If the data amount (PDCP data amount A) accumulated in the PDCP buffer falls below the threshold value, the UE 100 transmits the BSR to only one designated eNB out of the MeNB and the SeNB. The one eNB is set by the RRC signaling transmitted by the MeNB to the UE 100, for example. If the data amount (PDCP data amount A) accumulated in the PDCP buffer falls below the threshold value, the UE 100 transmits the data of the split bearer to only one designated eNB out of the MeNB and the SeNB. The MeNB receives the BSR (A+B) from the UE 100, and allocates, to the UE 100, an uplink radio resource, based on the received BSR. Specifically, the MeNB allocates, to the UE 100, a PUSCH resource having an amount corresponding to the data amounts A+B, based on the BSR. The MeNB transmits, to the UE 100, resource allocation information (UL grant) indicating the allocated radio resource. The UE 100 uses the allocated radio resource to transmit the data to the MeNB. The SeNB receives the BSR (A+C) from the UE 100, and allocates, to the UE 100, an uplink radio resource, based on the received BSR. Specifically, the SeNB allocates, to the UE 100, a PUSCH resource having an amount corresponding to the data amounts A+C, based on the BSR. The SeNB transmits, to the UE 100, resource allocation information (UL grant) indicating the allocated radio resource. The UE 100 uses the allocated radio resource to transmit the data to the SeNB.

Figure 12:
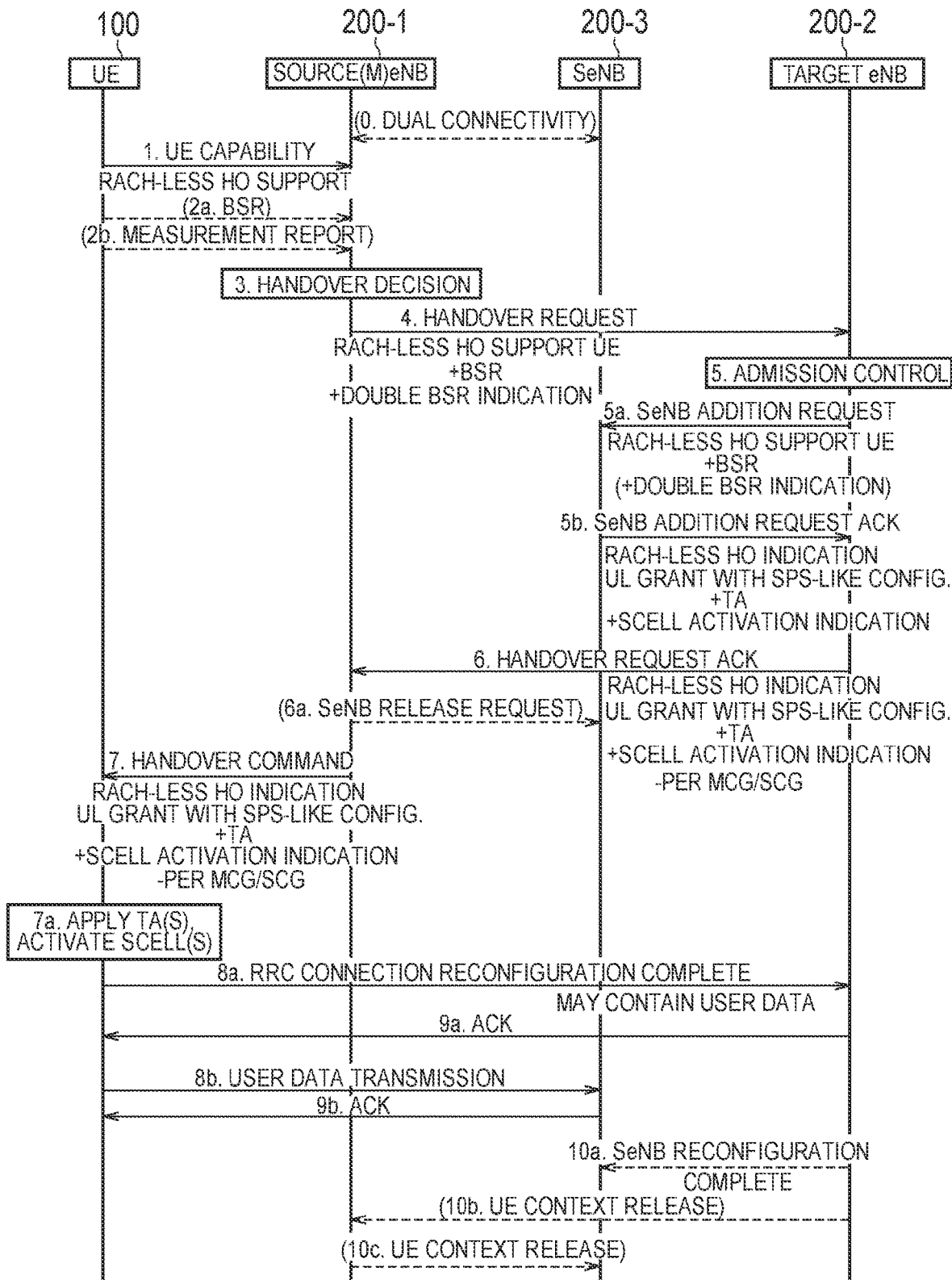
FIG. 12 is a chart illustrating a handover sequence according to a fifth embodiment.

FIG. 12 is a chart illustrating the handover sequence according to the fifth embodiment. In the handover sequence according to the fifth embodiment, a handover between the master eNBs (inter master eNB handover) is performed without changing the secondary eNB.

As illustrated in FIG. 12, in step 0, the UE 100 has the dual connection to the source eNB (source master eNB) 200-1 and a secondary eNB 200-3, and performs the dual connection communication.

Steps 1 to 4 are similar to those in the handover sequence according to the first embodiment. In step 4, if the double BSR is triggered (that is, if the UE 100 transmits the BSR to both the source eNB 200-1 and the secondary eNB 200-3), the source eNB (source master eNB) 200-1 may include a notification to that effect (Double BSR Indication), into the handover request message. Instead of the notification with an indication that the double BSR is triggered, a threshold value of the double BSR and a BSR value may be included into the handover request message.

In step 5, the target eNB (target master eNB) 200-2 performs a handover acceptance determination (Admission Control).

In step 5*a*, the target eNB 200-2 transmits an SeNB addition request message (SeNB Addition Request) to the secondary eNB 200-3. The SeNB addition request message may include at least one of a notification indicating a possibility of the RACH-less HO (RACH-less HO support UE), and the BSR notified from the source eNB 200-1. It may be possible to configure so that only if the double BSR is triggered, the BSR is included into the SeNB addition request message. Instead of the BSR, a notification indicating how much amount of uplink radio resource is the lowest limit may be included into the SeNB addition request message.

In step 5*b*, the secondary eNB 200-3 transmits an SeNB addition acknowledgement message (SeNB Addition Request Ack) to the target eNB 200-2. The SeNB addition acknowledgement message includes at least one of: a RACH-less HO execution notification (RACH-less HO indication) about the secondary eNB 200-3, an uplink grant (UL grant) indicating an uplink radio resource to be allocated by the secondary eNB 200-3 to the UE 100, a timing advance value (TA) to be applied to the secondary cell group (SCO), and an activation indication to activate the cell of the SCG (SCell Activation Indication). These information may be included in the SeNB addition acknowledgement message only if the RACH-less HO is implemented. These information corresponds to secondary base station information for omitting the random access procedure to the cell of the secondary eNB 200-1. Similarly to the first embodiment, the uplink grant may include information on a period during which the secondary eNB 200-3 secures the uplink radio resource.

In step 6, the target eNB 200-2 transmits the handover acknowledge message (Handover Request ACK) including information set by the target eNB 200-2 (MCG information) and secondary base station information (SCO information), to the source eNB 200-1. The MCG information and the SCG information may be included in the RRC container. The MCG information includes at least one of the timing advance value (TA) to be applied to the MCG and the activation indication of the cell of the MCG (SCell Activation Indication).

In step 6*a*, the source eNB 200-1 transmits an SeNB release request message (SeNB Release Request) to the secondary eNB 200-3.

In step 7, the source eNB 200-1 transmits the handover command (Handover Command) including the MCG information and the SCG information to the UE 100.

In step 7*a*, the UE 100 sets and applies each of the MCG information and the SCG information.

Steps 8*a* and 9*a* are similar to those in the handover sequence according to the first embodiment. The UE 100 omits the random access procedure to the target eNB 200-2 and performs the uplink transmission to the target eNB 200-2.

In step 8*b*, the UE 100 omits the random access procedure to the secondary eNB 200-3 and performs the uplink transmission to the secondary eNB 200-3.

In step 9*b*, if successful in uplink reception within the period during which the uplink radio resource is secured, the secondary eNB 200-3 transmits the ACK to the UE 100. Once the ACK is transmitted, the uplink resource is (implicitly) released, and the secondary eNB 200-3 may return to a normal allocation sequence. If not successful in the uplink reception within the period during which the uplink radio resource is secured, the secondary eNB 200-3 transmits the NACK to the UE 100. Once the NACK is transmitted, the uplink resource is (implicitly) released, and the secondary eNB 200-3 may return to a normal allocation sequence. Upon receiving the NACK, the UE 100 may start the random access to the secondary eNB 200-3 by using the general random access procedure.

In step 10a, the target eNB 200-2 transmits an SeNB reconfiguration complete message (SeNB Reconfiguration Complete) to the secondary eNB 200-3.

In step 10b, the target eNB 200-2 transmits the release message (UE Context Release) indicating the release of the context information of the UE 100, to the source eNB 200-1.

In step 10c, the source eNB 200-1 transmits the release message (UE Context Release) indicating the release of the context information of the UE 100, to the secondary eNB 200-3.

According to the fifth embodiment, in the inter master eNB handover where the secondary eNB is not changed, the UE 100 may not only omit the random access procedure to the target eNB (target master eNB) 200-2 but also may omit the random access procedure to the secondary eNB 200-3. Therefore, it is possible to reduce a communication interruption time with the secondary eNB 200-3 during the inter master eNB handover where the secondary eNB is not changed.

Sixth Embodiment

A sixth embodiment will be described with a particular focus on a difference from the first to fifth embodiments.

The UE 100 according to the sixth embodiment performs, before the handover, a pre-random access procedure to the target eNB 200-2. In the sixth embodiment, in order to perform the pre-random access procedure, a state where the DC is temporarily performed is created. In this DC state, the UE 100 acquires the timing advance value (TA) by the pre-random access procedure. The UE 100 stores the timing advance value in association with the timing advance group identifier (TAG ID). When actually performing the handover, the UE 100 uses the stored timing advance value to adjust the transmission timing to the target eNB 200-2.

Figure 13:
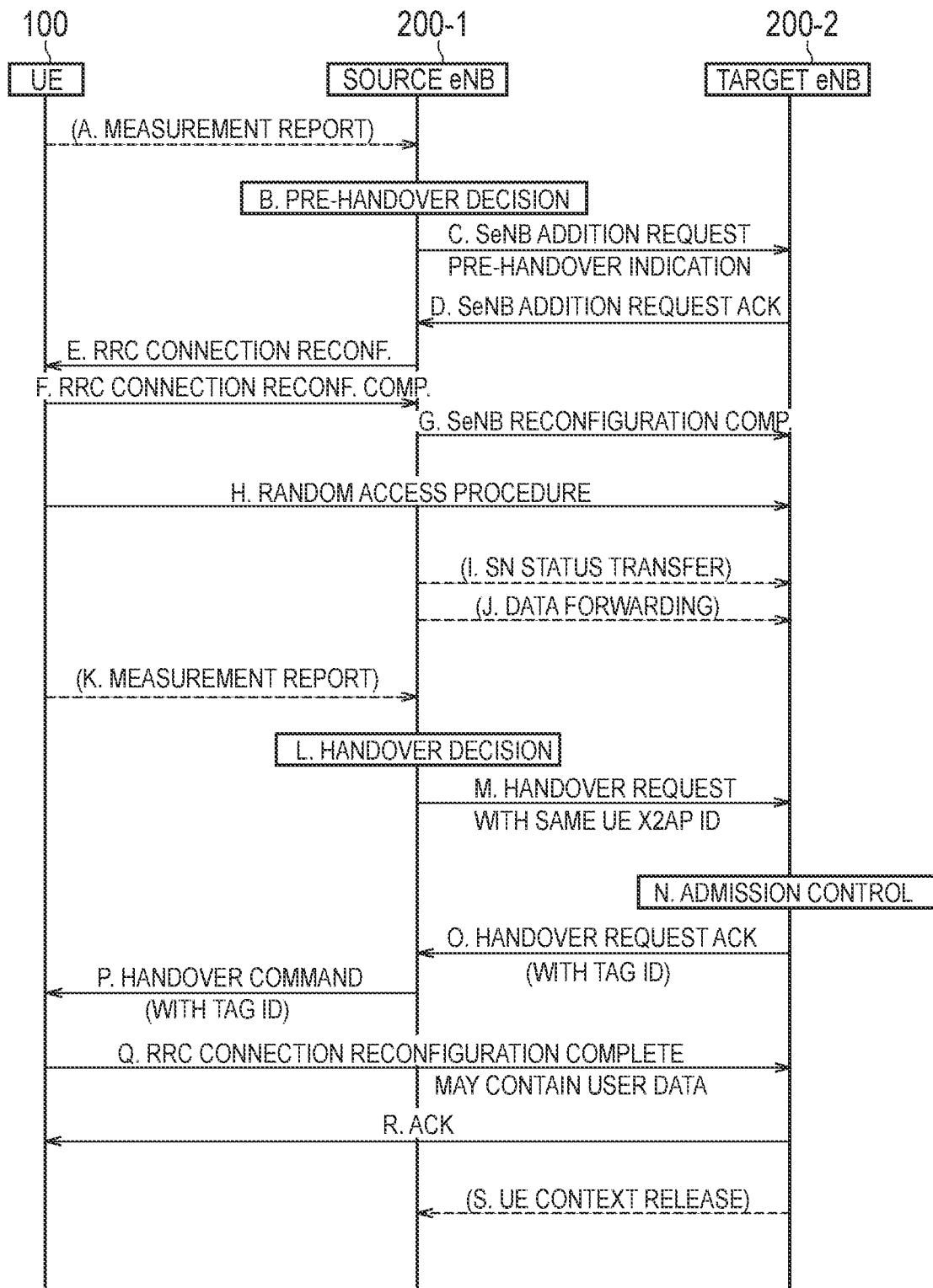
FIG. 13 is a chart illustrating a handover sequence according to a sixth embodiment.

FIG. 13 is a chart illustrating the handover sequence according to the sixth embodiment.

As illustrated in FIG. 13, in step A, the UE 100 transmits the measurement report (Measurement Report) to the source eNB 200-1. The measurement report is used for a pre-handover decision (Pre-handover decision) in step B.

In step B, the source eNB 200-1 decides the pre-handover (pre-random access procedure) to the target eNB 200-2.

In step C, the source eNB 200-1 transmits the SeNB addition request message (SeNB Addition Request) to the target eNB 200-2. The SeNB addition request message may include a notification (Pre-handover indication) indicating the pre-handover (pre-random access procedure).

In step D, the target eNB 200-2 transmits the SeNB addition acknowledgement message (SeNB Addition Request Ack) to the source eNB 200-1.

In step E, the source eNB 200-1 transmits instruction information (RRC Connection Reconf.) for instructing the pre-handover to the target eNB 200-2 (pre-random access procedure), to the UE 100.

In step F, the UE 100 transmits a completion notification (RRC Connection Reconf. Comp.) in response to the instruction information, to the source eNB 200-1.

In step G, the source eNB 200-1 transmits an SeNB reconfiguration complete message (SeNB Reconfiguration Comp.) to the target eNB 200-2.

In step H, the UE 100 performs the pre-random access procedure to the target eNB 200-2, in response to the instruction information in step E. In the pre-random access procedure, the UE 100 acquires the timing advance value (TA). The UE 100 stores the timing advance value in association with the timing advance group identifier (TAG ID).

In steps I and J, the source eNB 200-1 performs pre-data forwarding to the target eNB 200-2.

In step K, the UE 100 transmits the measurement report (Measurement report) to the source eNB 200-1. The measurement report is used for a handover decision (Handover decision) in step L.

In step L, the source eNB 200-1 decides the handover to the target eNB 200-2.

In step M, the source eNB 200-1 transmits a handover request message (HO Request) to the target eNB 200-2. The source eNB 200-1 may apply the same UE X2AP ID as the SeNB addition request message in step C, to the handover request message.

In step N, the target eNB 200-2 performs a handover acceptance determination (Admission Control).

In step O, the target eNB 200-2 transmits a handover acknowledge message (HO Request ACK) to the source eNB 200-1. The target eNB 200-2 includes the TAG ID acquired by the pre-handover (pre-random access procedure), into the handover acknowledge message. The TAG ID may be included in the RRC container.

In step P, the source eNB 200-1 transmits the handover command (Handover Command) including the TAG ID to the UE 100.

In step Q, the UE 100 omits the random access procedure to the target eNB 200-2, and performs the uplink transmission to the target eNB 200-2 by applying the timing advance value corresponding to the TAG ID.

In step R, the target eNB 200-2 transmits the ACK to the UE 100.

In step S, the target eNB 200-2 transmits the release message (UE Context Release) indicating the release of the context information of the UE 100, to the source eNB 200-1.

According to the sixth embodiment, before the handover, the pre-random access procedure to the target eNB 200-2 is performed. Thus, as compared with the first to fifth embodiments, it is possible to obtain a more accurate timing advance value (TA).

Modification of Sixth Embodiment

In the sixth embodiment described above, before the handover, the UE 100 performs the pre-random access procedure to the target eNB 200-2 (target cell) to thereby obtain the timing advance value (TA) to be applied to the target cell. Specifically, to perform the pre-random access procedure, a state where the DC is performed is temporarily established.

On the other hand, a modification of the sixth embodiment shares in common with the sixth embodiment that the UE 100 performs the pre-random access procedure; however, the state where the DC is performed is not established. In other words, the UE 100 performs the pre-random access procedure, but does not establish a connection with the target eNB 200-2.

Figure 14:
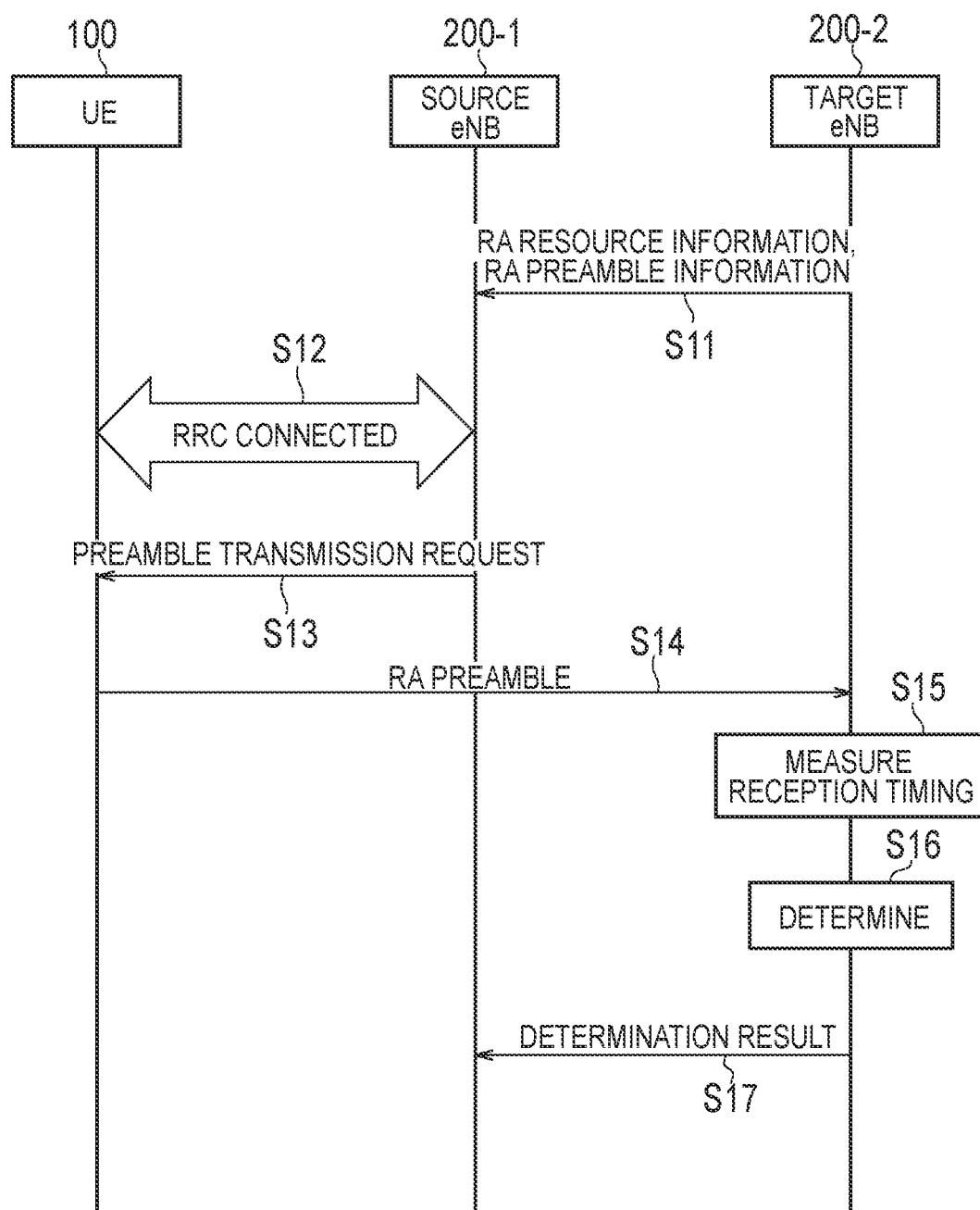
FIG. 14 is a chart illustrating a handover sequence according to a modification of the sixth embodiment.

FIG. 14 is a chart illustrating the handover sequence according to the modification of the sixth embodiment.

Here, the synchronous network is assumed. It is assumed that the source eNB 200-1 (source cell) and the target eNB 200-2 (target cell) are synchronized.

As illustrated in FIG. 14, in step S11, the target eNB 200-2 transmits RA resource information and RA preamble information to the source eNB 200-1.

The RA resource information is information indicating a specific time-frequency resource prepared for the target eNB 200-2 to receive the random access preamble from the UE 100 subordinate to the source eNB 200-1. The specific time-frequency resource may be set separately of a PRACH resource region for a normal operation. The specific time-frequency resource may be part of the PRACH resource region for a normal operation. The source eNB 200-1 renders blank the specific time-frequency resource (that is, does not use the specific time-frequency resource for communication within the cell of the source eNB 200-1).

The RA preamble information is information indicating one or a plurality of random access preambles (specific preamble sequence) that the target eNB 200-2 allows the UE 100 subordinate to the source eNB 200-1 to transmit.

A process of step S11 may be performed during establishment of an X2 interface between the source eNB 200-1 and the target eNB 200-2. In this case, the process of step S11 may be performed in an X2 Setup procedure. The process of step S11 may be performed when the setting of the target eNB 200-2 is updated. In this case, the process of step S11 may be performed in an eNB Configuration Update procedure.

In step S12, the UE 100 is in a state where the RRC connection with the source eNB 200-1 is established (RRC Connected). In a manner similar to that in the embodiments described above, the source eNB 200-1 recognizes that the UE 100 needs to perform the handover to the target eNB 200-2.

In step S13, the source eNB 200-1 designates a specific time-frequency resource and a specific preamble sequence notified from the target eNB 200-2 to the UE 100, and requests the UE 100 to transmit the random access preamble.

In step S14, the UE 100 transmits, in response to receiving the request from the source eNB 200-1, the random access preamble. The target eNB 200-2 monitors the random access preamble in the specific time-frequency resource notified to the source eNB 200-1. The target eNB 200-2 receives (senses) the random access preamble transmitted from the UE 100.

In step S15, the target eNB 200-2 measures a reception timing of the random access preamble.

In step S16, the target eNB 200-2 determines whether or not it is possible to continue to use the current timing advance value, based on the reception timing of the random access preamble, on the assumption that the UE 100 has performed the handover at the present moment.

Figure 15:
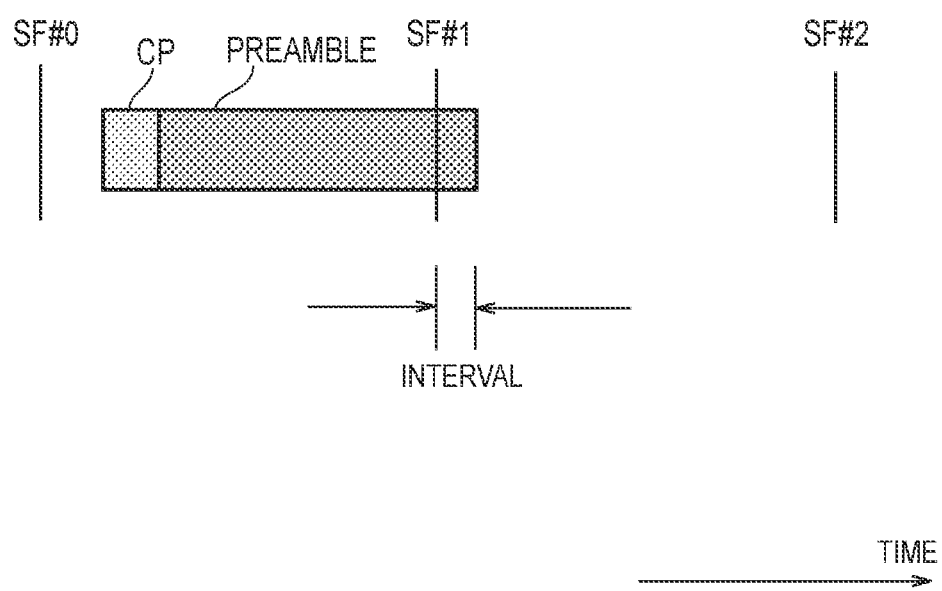
FIG. 15 is a diagram illustrating a reception timing of a random access preamble in a target eNB according to the modification of the sixth embodiment.

FIG. 15 is a diagram illustrating the reception timing of the random access preamble in the target eNB 200-2. As illustrated in FIG. 15, the target eNB 200-2 calculates an interval between a timing for completely receiving the random access preamble and a start timing for a next subframe. If this interval is a predetermined value or more, it is determined that it is possible to continue to use the current timing advance value. The predetermined value needs to be a value to not cause a problem to the transmission of the UE assigned to a next subframe if the UE 100 performs a normal data transmission in a cell of a handover destination, and is, for example, "guard time (0.1 msec)–Tcp value (4.7 μsec [144 Ts])". It is noted that "Ts" is a value expressed in a unit time of LTE.

As illustrated in FIG. 14, in step S17, the target eNB 200-2 notifies the source eNB 200-1 of a determination result of step S13. The target eNB 200-2 may transmit the received random access preamble number (Preamble ID) and the determination result (OK or NG), to the source eNB 200-1. The preamble number (Preamble ID) may be transmitted only if the determination result is "OK". The target eNB 200-2 may transmit, in response to receiving the request from the source eNB 200-1, the determination result, to the source eNB 200-1.

If the determination result is "OK", the source eNB 200-1 designates the UE 100, based on the preamble number (Preamble ID). The source eNB 200-1 performs control so to apply the RACH-less HO to the UE 100. In this case, the UE 100 applies the current timing advance value applied to the source eNB 200-1, to the target eNB 200-2 during handover. On the other hand, if the determination result is "NG", the source eNB 200-1 performs control so not to apply the RACH-less HO to the UE 100. The other operations are similar to those in the embodiments described above.

An example where the synchronous network is assumed in this sequence has been described; however, this sequence may be applied to an asynchronous network. In this case, it may suffice that each eNB comprehends a synchronization deviation amount with another eNB and operates by considering the amount of synchronization deviation.

In this sequence, an example has been described where it is determined whether it is possible to continue to use the current timing advance value. Thus, if it is not possible to continue to use the current timing advance value, the RACH-less HO cannot be applied to the UE 100.

However, if the UE 100 supports a plurality of timing advance groups (TAG), it is possible to previously obtain, before the handover, the timing advance value to be applied to the target eNB 200-2. In this case, a sequence similar to that in the handover sequence according to the sixth embodiment described above is used; however, a process of adding, as the SeNB, the target eNB 200-2 is omitted. Such a sequence will be described while focusing on a difference from the aforementioned sixth embodiment.

Firstly, the UE 100 notifies the source eNB 200-1 of the number of supported timing advance groups. The source eNB 200-1 determines, based on the notification, that the UE 100 can manage the timing advance value with the target eNB 200-2.

Secondly, similarly to the sequence of FIG. 14, the source eNB 200-1 notifies the UE 100 of the specific time-frequency resource and the specific preamble sequence of the target eNB 200-2. In a case of the asynchronous network, the source eNB 200-1 may set a gap for random access preamble transmission, to the UE 100. The source eNB 200-1 does not perform the communication with the UE 100 during the gap.

Thirdly, the UE 100 uses the specific time-frequency resource and the specific preamble sequence to transmit the random access preamble to the target eNB 200-2. The target eNB 200-2 uses the random access preamble received from the UE 100 to calculate the timing advance value. The target eNB 200-2 notifies the UE 100 of the timing advance value, through the source eNB 200-1.

The UE 100 may periodically transmit the random access preamble. The UE 100 may transmit the random access preamble in response to a received power of a reference signal from the source eNB 200-1 falling below a threshold value and/or a received power of a reference signal from the target eNB 200-2 being equal to or more than a threshold value. The period and the threshold value may be notified from the source eNB 200-1 to the UE 100 in the RRC signaling or the like, and may be a fixed value set in advance.

Seventh Embodiment

A seventh embodiment will be described with a particular focus on a difference from the first to sixth embodiments. In the RACH-less HO according to the above-described embodiments, the operation of deciding the timing advance value to be applied to the target eNB 200-2 (target cell) on the network side is mainly described. On the other hand, in the seventh embodiment, the timing advance value is decided autonomously on the UE 100 side.

The UE 100 according to the seventh embodiment, receives, before the handover, a first known signal transmitted from the source eNB 200-1 (source cell) and a second known signal transmitted from the target eNB 200-2 (target cell). In the seventh embodiment, the synchronous network is assumed, and the first and second known signals are transmitted in the same symbol. In other words, the first and second known signals are transmitted at the same time. However, the first and second known signals are multiplexed in a frequency direction (FDM). Each of the time-frequency resources (resource elements) and/or the sequences of the first and second known signals may be notified by the RRC signaling or the like from the source eNB 200-1 to the UE 100, and defined according to the cell ID or the like.

FIGS. 16A and 16B are diagrams illustrating the first and second known signals according to the seventh embodiment. In FIGS. 16A and 16B, one zone in the time direction means one subframe.

As illustrated in FIGS. 16A and 16B, the source eNB 200-1 (source cell) uses a first subcarrier of a specific symbol (hereinafter, referred to as "first resource region") to transmit the first known signal. The first known signal may be referred to as "pilot signal (PS)". The target eNB 200-2 (target cell) uses a second subcarrier of a specific symbol (hereinafter, referred to as "second resource region") to transmit the second known signal. In the example illustrated in FIGS. 16A and 16B, a frequency (subcarrier) at which the known signal is transmitted is consistent with a frequency at which the synchronization signal (PSS, SSS) is transmitted.

The source eNB 200-1 may stop the transmission of the station of the source eNB 200-1 in the second resource region. The target eNB 200-2 may stop the transmission of the station of the target eNB 200-2 in the first resource region. The resource region where the transmission of the station of the target eNB 200-2 is stopped may be referred to as "neighbor pilot signal monitoring (NCPS-M)". The source eNB 200-1 may implicitly notify the UE 100 of the NCPS-M. The source eNB 200-1 may set a measurement gap in a timing for transmitting the first and second synchronization signals, to UE 100.

In the symbol in which the known signal is transmitted, the UE 100 calculates an arrival time difference in known signal between the source eNB 200-1 and the target eNB 200-2. That is, the UE 100 calculates the arrival time difference between the first and second known signals. The UE 100 decides a second timing advance value to be applied to the target eNB 200-2, based on a first timing advance value to be applied to the source eNB 200-1 (the current timing advance value) and the arrival time difference. For example, the UE 100 calculates, as the second timing advance value, a value obtained by adding twice a value of the arrival time difference to the first timing advance value. The UE 100 performs the RACH-less HO by using the calculated second timing advance value.

In the seventh embodiment, the UE 100 may measure each of the received powers of the first and second known signals, and may further calculate a received power difference therebetween. The UE 100 may decide, based on the received power difference, an uplink transmission power to be applied to the target eNB 200-2 (for example, may correct a transmission power for an initial uplink transmission). For example, a value obtained by adding 2*(P1−P2) to the transmission power that was used in the source eNB 200-1 is calculated as the transmission power of the target eNB 200-2, where P1 denotes a received power from the source eNB 200-1 and P2 (P1>P2) denotes a received power from the target eNB 200-2.

An example was described where the first and second known signals are multiplexed (FDM) in the frequency direction. However, the first and second known signals may be multiplexed (CDM) by a code sequence. The synchronous network was assumed; however, the asynchronous network may also be assumed. In this case, the source eNB 200-1 may notify the UE 100 of the synchronization deviation amount with the target eNB 200-2, and the UE 100 may calculate the arrival time difference in consideration of the synchronization deviation amount.

Other Embodiments

The operation according to the embodiments described above can also be applied to a case where the source cell and the target cell belong to the same eNB 200. Such a case may be referred to as "intra-eNB handover". In a case of the intra-eNB handover, the process performed by the target eNB 200-2 in the operation according to the embodiments described above is to be performed by the source eNB 200-1.

Further, the operation according to the embodiments described above can also be applied to an SCG Change. The SCG Change is a reconfiguration procedure of the SCG, and is usually accompanied by the random access on a primary secondary cell (PSCell). The SCG Change may be performed in the same eNB, and the SCG Change may be performed between different eNBs. The handover command described above may be replaced by a command of the SCG Change, and the above-mentioned target cell may be replaced by the primary secondary cell (PSCell).

In each of the embodiments described above, a case was described where a new information element according to the embodiments is included in the handover request message, the handover acknowledge message, and the handover command. However, the new information element according to the embodiments may be included in a predetermined message other than these messages. The predetermined message may be a message transmitted periodically.

Each of the above-described embodiments may be implemented independently; two or more embodiments may be combined and implemented. For example, a part of the configuration according to one embodiment may be added to another embodiment. Alternatively, the part of the configuration according to one embodiment may be replaced by a part of a configuration of another embodiment.

In the above-described embodiment, the LTE system is exemplified as the mobile communication system. However, the present invention is not limited to the LTE system. The present invention may be applied to systems other than the LTE system.

INDUSTRIAL APPLICABILITY

The present invention is useful in the field of communication.

The invention claimed is:

1. A method for dual connectivity performed by a first base station, a second base station, and a radio terminal, the method comprising:
   acquiring, by the first base station, capability information indicating that the radio terminal supports a function of omitting a random access procedure in initial access to a base station;
   transmitting, by the first base station to the second base station, an SeNB Addition Request message including the capability information;
   transmitting, by the second base station, an SeNB Addition Acknowledgment message to the first base station, wherein the SeNB addition acknowledgment message includes an uplink grant indicating uplink radio resources allocated by the second base station to the radio terminal, a timing advance (TA) value to be applied to uplink transmission to the second base station, and information indicating that the radio terminal omit the random access procedure to the second base station;
   transmitting, by the first base station, first message for notifying the radio terminal of the uplink grant, the TA value and the information;
   omitting, by the radio terminal, the random access procedure to the second base station, based on the TA value and the information; and
   performing, by the radio terminal, uplink transmission to the second base station by using the uplink radio resources indicated in the uplink grant.

2. A first base station configured to perform dual connectivity with a second base station and a radio terminal, the first base station comprising:
   a processor and a memory coupled to the processor, the processor is configured to:
   acquire capability information indicating that the radio terminal supports a function of omitting a random access procedure in initial access to a base station;
   transmit an SeNB Addition Request message including the capability information to the second base station;
   receive an SeNB Addition Acknowledgment message from the first base station, wherein the SeNB addition acknowledgment message includes an uplink grant indicating uplink radio resources allocated by the second base station to the radio terminal, a timing advance (TA) value to be applied to uplink transmission to the second base station, and information indicating that the radio terminal omit the random access procedure to the second base station; and
   transmit first message for notifying the radio terminal of the uplink grant, the TA value and the information.

3. An apparatus to be provided in a first base station configured to perform dual connectivity with a second base station and a radio terminal, the apparatus comprising:
   a processor and a memory coupled to the processor, the processor is configured to:
   acquire capability information indicating that the radio terminal supports a function of omitting a random access procedure in initial access to a base station;
   transmit an SeNB Addition Request message including the capability information to the second base station;
   receive an SeNB Addition Acknowledgment message from the first base station, wherein the SeNB addition acknowledgment message includes an uplink grant indicating uplink radio resources allocated by the second base station to the radio terminal, a timing advance (TA) value to be applied to uplink transmission to the second base station, and information indicating that the radio terminal omit the random access procedure to the second base station; and
   transmit first message for notifying the radio terminal of the uplink grant, the TA value and the information.

* * * * *